(12) United States Patent
Sakoda et al.

(10) Patent No.: US 6,519,292 B1
(45) Date of Patent: Feb. 11, 2003

(54) TRANSMISSION METHOD, TRANSMITTER AND RECEIVER

(75) Inventors: Kazuyuki Sakoda, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/252,808

(22) Filed: Feb. 19, 1999

(30) Foreign Application Priority Data

Feb. 26, 1998 (JP) ............................................. 10-045632

(51) Int. Cl.[7] .................. H04L 27/04; H04L 27/12; H04L 27/20; H04L 27/30; H04B 3/46
(52) U.S. Cl. .................. 375/295; 375/225; 375/130; 375/146
(58) Field of Search ................................ 375/295, 146, 375/225, 130; 370/311, 18

(56) References Cited

U.S. PATENT DOCUMENTS

| | | | | |
|---|---|---|---|---|
| 5,280,472 A | * | 1/1994 | Gilhousen et al. ............. 370/18 |
| 5,533,012 A | * | 7/1996 | Fukasawa ..................... 370/18 |
| 5,603,096 A | * | 2/1997 | Gilhousen et al. ............. 455/69 |
| 5,790,588 A | * | 8/1998 | Fukawa et al. ............... 375/200 |
| 5,802,105 A | * | 9/1998 | Tiedemann, Jr. et al. ... 375/225 |
| 5,856,971 A | * | 1/1999 | Giltin et al. ................ 370/335 |
| 5,881,099 A | * | 3/1999 | Takahashi et al. ........... 375/206 |
| 5,896,374 A | * | 4/1999 | Okumura et al. ............ 370/311 |
| 5,909,434 A | * | 6/1999 | Odenwalder et al. ........ 370/342 |
| 5,943,361 A | * | 8/1999 | Gilhousen et al. ........... 375/200 |
| 5,946,344 A | * | 8/1999 | Warren et al. ............... 375/207 |
| 5,966,377 A | * | 10/1999 | Murai ......................... 370/342 |

\* cited by examiner

*Primary Examiner*—Chi Pham
*Assistant Examiner*—Tony Al-Beshrawi
(74) *Attorney, Agent, or Firm*—Jay H. Maioli

(57) ABSTRACT

A transmission method and apparatus which perform communication without interfering with other types of communication is provided. A transmission symbol stream is generated by applying predetermined modulation processing to an encoded bit series obtained by encoding an information bit series of a predetermined transmission rate. A transmission signal generated by applying the transmission processing to the transmission symbol series is then transmitted. A transmission-information bit series with a transmission rate lower than the predetermined transmission rate is generated first. Transmission of the transmission signal generated in accordance with the transmission-information bit series then begins through a predetermine communication channel. The low transmission rate is then sequentially stepwise increased to the predetermined transmission rate. Transmission is performed while sequentially stepwise increasing the number of communication channels in accordance with the sequential stepwise increase of the low transmission rate.

8 Claims, 13 Drawing Sheets

TRANSMISSION METHOD, TRANSMITTER AND RECEIVER

BACKGROUND OF THE INVENTION

1. Field of the Invention

The present invention relates to a transmission method, a transmitter and a receiver, which is preferably applied to a cellular radio-communication system such as a portable telephone system.

2. Description of the Related Art

A conventional cellular radio-communication system is constituted so that an area for which communication services are provided is divided into cells of a desired size, a base station serving as a fixed radio station is set in each of the cells, and a portable telephone serving as a mobile radio station performs radio communication with a base station in a cell in which the portable telephone is present.

In the above case, various communication systems are considered between a portable telephone and a base station. Typical systems are the code division multiple access (CDMA) system and the time division multiple access (TDMA) system.

The CDMA system is a communication system for transmitting a narrow-band modulated wave (primary modulation) by spectrum-spreading the frequency bandwidth of the wave (secondary-modulating) and thereby, widening the width up to several tens of times or more, in which every communication is performed by using the same radio carrier so that multiple access can be realized by assigning an independent spread code to each communication channel and thereby assigning the same wide frequency band to a multiplicity of communication channels. The receiving side can restore transmission information by reverse-spreading the signal of a desired channel, thereby recognizing signals of other channels as noises and extracting only a purposed primary-modulated wave, and demodulating the wave.

The transmitter and receiver of a cellular radio-communication system for transmitting or receiving a digital signal in accordance with the CDMA system are described below by referring to FIGS. 1 and 2. In this connection, the transmitter and receiver shown in FIGS. 1 and 2 are mounted on, for example, the base station of a portable telephone system or a portable telephone and used for the up communication from the portable telephone to the base station or the down communication from the base station to the portable telephone.

As shown in FIG. 1, symbol 1 denotes the transmitter of a cellular radio-system according to the DS(Direct Spread)-CDMA system (hereafter simply referred to as CDMA system) as a whole. In FIG. 1, a case is assumed in which a communication environment using the same frequency band for all adjacent cells, that is, the so-called state in which the number of repetitions of frequency is "1" is set and an information bit stream S1 is transmitted at a bit rate of 8 K[bit/sec] desired by a user by using a bandwidth of 1.024[MHz].

The transmitter 1 first inputs the information bit stream S1 of a bit rate of 8K[bit/sec] to an encoding section 2. The encoding section 2 generates a transmission symbol stream S2 of 16K[Coded bit/sec] encoded at an encoding rate of ½ by applying the convolutional encoding which is one of error corrections to the information bit stream S1 and rearranging the sequence of transmission symbols thereby obtained at random (rearranging of the sequence is hereafter referred to as interleaving) and transmits the stream S2 to a spread-code multiplier 3.

The spread-code multiplier 3 generates a transmission symbol stream-S3 spread to 1024K[Chip bit/sec] by multiplying the 16K[Coded bit/sec] transmission symbol stream S2 by a spread code C1 having a spreading ratio (hereafter referred to as SP) of 64 supplied by a spread-code generating section 4 and supplies the stream S3 to a long-code multiplier 5. In this case, the spread-code multiplier 3 assigns the same frequency band to 64 channels by using 64 types of PN codes orthogonal to each other.

In this case, in the transmitter 1, the spread code C1 having an SP corresponding to the bit rate of the information bit stream S1 is assigned by the spread-code generating section 4 when channel assignment is requested. Therefore, when the bit rate of the information bit stream S1 is 16K[bit/sec], the spread code C1 having an SP of 32 is assigned.

The long-code multiplier 5 performs scrambling by multiplying the transmission symbol stream S3 by a long code C2 intrinsically set to each base station supplied from a long-code generating section 6 so that crosstalk does not occur even if the same spread code C1 is used for adjacent cells and transmits a transmission symbol stream S4 of 1024K[chip/sec] thereby obtained to a symbol mapping section 7.

In this case, because the number of repetitions of frequency is "1", the same frequency band is used for adjacent cells and moreover, the same frequency band is used for the spread code C1. Therefore, by using the long code C2 intrinsically provided for each base station, the interference between adjacent cells is prevented. That is, in the case of a CDMA cellular radio-communication system, the spread codes C1 used for portable telephones are orthogonal to each other in the same cell. However, there is not orthogonal relation between adjacent cells.

The symbol mapping section 7 generates a transmission signal S5 showing each piece of symbol information by a phase value by applying the binary phase-shift keying (BPSK) modulation processing to the transmission symbol stream S4 successively input and transmits the signal S5 to a transmission circuit 8.

The transmission circuit 8 generates a transmission signal S6 of a predetermined frequency channel by filtering the transmission signal S5, then transforming the signal S5 into an analog signal, and multiplying the transmission signal transformed into an analog signal by a high frequency, and thereby frequency-converting the analog transmission signal into a desired frequency band (e.g. approx. 800[MHz]), and amplifies the signal S6 to a predetermined power and thereafter transmits the signal S6 through an antenna 9.

Moreover, as shown in FIG. 2, the receiver 10 receives the transmission signal S6 transmitted from the transmitter 1 through an antenna 11 and inputs the signal S6 to a receiving circuit 12 as a reception signal S11. The receiving circuit 12 fetches a base band signal by amplifying the reception signal S11 up to a predetermined level and then, frequency-converting the signal S11, moreover fetches a BPSK-modulated reception signal S12 by filtering the base band signal and then, transforming the signal S12 into a digital signal, and transmits the signal S12 to a bit-stream extracting section 13.

The bit-stream extracting section 13 fetches symbol information by applying the BPSK demodulation processing to the reception signal S12 and transmits the symbol information to a long-code multiplier 14 as a reception symbol stream S13 of 1024K[chip/sec].

The long-code multiplier 14 receives a long code C3 same as that generated in the long-code generating section 6 at the transmission side from a long-code generating section 15 and performs descrambling by multiplying the reception symbol stream S13 by the long code C3. Thereby, the long-code multiplier 14 generates a reception symbol stream S14 of 1024K[chip/sec] same as the transmission symbol stream S3 generated at the transmission side and transmits the stream S14 to a spread-code multiplier 16.

The spread-code multiplier 16 generates a spread code C4 same as the spread code C1 generated by the spread-code generating section 4 at the transmission side with the spread-code generating section 17, reverse-spreading the spread code C4 by multiplying the reception symbol stream S14 of 1024K[chip/sec] by the spread code C4, and transmits a reception symbol stream S15 of 16K[Coded bit/sec] thereby obtained to a decoding section 18.

The decoding section 18 returns the sequence of reception symbol streams S15 to the original sequence by reversing the rearrangement performed in the encoding section 2 of the transmitter 1 (returning to the original sequence is hereafter referred to as deinterleaving) and the soft-decision Viterbi decoding is performed by considering the trellis of a convolutional code in accordance with a reception symbol stream thereby obtained and estimating the maximum likelihood state (so-called maximum-likelihood series estimation) out of all state transitions which can be used as data and thus and an information bit stream S16 of 8K[bit/sec] showing the data thus transmitted is restored and output.

As shown in FIG. 3, the TDMA system is, for example, a communication system of temporally classifying a predetermined frequency channel in accordance with frames F0, F1, . . . respectively having a predetermined time width, dividing the frames F0, F1, . . . into time slots TS0 to TS7 (in this case, 8 time slots) respectively having a predetermined time width, and using the frequency channel at the timing of the time slot TS0 assigned to a local station, and thereby transmitting a transmission signal, in which pluralities of communications (so-called multiple access) are realized with the same frequency channel to efficiently use frequencies. In the subsequent description, the time slot TS0 assigned for transmission is referred to as a transmission slot TX and a data block sent by one transmission slot TX is referred to as a slot.

In this case, the time slot TS0 is assigned to a user A, the time slot TS1 is assigned to a user B, the time slots TS2 and TS3 are assigned to a user C, and the time slots TS4 to TS7 are assigned to a user D. Thereby, transmission rates can be changed by changing the number of time slots to be used every user. Even in this case, however, a transmission rate of 8K[bit/sec] desired by a user is assigned to each physical channel (in this case, the total of 8 channels because there are 8 time slots) since the establishment of communication channels but the transmission rate for each channel is not changed under communication.

In this connection, in the case of the TDMA system, each of the time slots TS0 to TS7 is assigned to a predetermined frequency channel whenever it is actually transmitted by the transmission slot TX so that an assigned frequency channel is released whenever transmission is completed, and a frequency is effectively used by using a frequency channel only when thereby performing transmission.

Then, the transmitter and receiver of a cellular radio-communication system for transmitting or receiving a digital signal in accordance with the TDMA system are described below by referring to FIGS. 4 and 5. In this connection, the transmitter and receiver shown in FIGS. 4 and 5 are mounted on, for example, the base station of a portable telephone system or a portable telephone and used for the up communication from the portable telephone to the base station or the down communication from the base station to the portable telephone.

As shown in FIG. 4, symbol 20 shows the transmitter of a TDMA cellular radio-communication system for performing frequency hopping (FH) as a whole. Also in FIG. 4, a case is assumed in which a communication environment using the same frequency band for all adjacent cells, a so-called state in which the number of repetitions of frequency is "1" is set and the information bit stream S1 is transmitted at a bit rate of 8K[bit/sec] desired by a user by using a predetermined bandwidth.

The transmitter 20 first inputs an information bit stream S20 of 8K[bit/sec] to an encoding section 21. The encoding section 21 generates a transmission symbol stream S21 of 16K[Coded bit/sec] encoded at an encoding rate of ½ by applying the convolutional encoding to the information bit stream S20 and applying interleaving to a transmission symbol thereby obtained and transmits the stream S21 to a symbol mapping section 22.

The symbol mapping section 22 generates a transmission signal S22 showing each piece of symbol information by a phase value by classifying the transmission symbol stream S21 every predetermined number of bits in order to assign the stream S21 to the transmission slot TX and applying the BPSK (Binary Phase-Shift Keying) modulation processing to a transmission symbol stream thereby obtained and transmits the signal S22 to a transmitting circuit 23.

The transmitting circuit 23 generates a transmission signal S23 of a predetermined frequency channel by filtering the transmission signal S22 and thereafter transforming the signal S22 into an analog signal and multiplying the transmission signal transformed into an analog signal by a high-frequency signal, and thereby frequency-converting the analog transmission signal into a desired frequency band (e.g. approx. 800[MHz]), and amplifies the signal S23 up to a predetermined power and thereafter, transmits the signal S23 classified in slots through an antenna 24 synchronously with the timing of the transmission slot TX.

Moreover, the transmitting circuit 23 is constituted so as to change frequency channels used every slot at random in accordance with a predetermined pattern (so-called frequency hopping) and thereby, reduce the influence of interference waves received from other types of communication.

Thus, in the case of the TDMA system for performing frequency hopping, though physical frequency channels are changed at random, one logical channel is assigned to a user and only physically-usable portions (frequency channel) of the logical channel are changed. Therefore, the logical channel assigned to each user at the establishment of communication is constantly used while communication is performed between a base station and a portable telephone.

Moreover, as shown in FIG. 5, a receiver 30 receives the transmission signal S23 transmitted from the transmitter 20 through an antenna 31 and inputs the signal 523 to a receiving circuit 32 as a reception signal S31. The receiving circuit 32 fetches a base-band signal by amplifying the reception signal S31 up to a predetermined level and thereafter, frequency-converting the signal S31 and moreover, fetches the BPSK-modulated reception signal S32 by filtering the base-band signal and thereafter, converting the signal into a digital signal, and transmits the signal S32 to a bit-stream extracting section 33.

In this case, the receiving circuit 32 changes frequency channels received in accordance with a hopping pattern same as that of the frequency hopping performed at the transmission side and thereby, accurately executes the receiving operation in accordance with the change of transmission-side frequency channels.

The bit-stream extracting section 33 fetches symbol information by applying the BPSK demodulation processing to the reception signal S32 and transmits the symbol information to a decoding section 34 as a reception symbol stream S33 of 16K[coded bit/sec].

The decoding section 34 deinterleaves the reception symbol stream S33 by reversing the rearrangement performed by the encoding section 21 of the transmitter 20, performs the maximum-likelihood series estimation in accordance with the reception symbol stream obtained as the result of deinterleaving and thereby, performs the soft-decision Viterbi decoding, and restores and outputs the information bit stream S34 of 8K[bit/sec] showing the data transmitted as the result of the soft-decision Viterbi decoding.

In the case of the CDMA cellular radio-communication system having the above structure, if a portable telephone currently transmitting undesired waves is present at a position very close to a base station in the up channel from the portable telephone to the base station, the undesired waves output from the portable telephone serve as interference components. To reduce the influence of the interference components, in the case of the CDMA cellular radio-communication system, both the base station and the portable telephone monitor the reception power (or the quality of the reception power) so as to control the transmission power by communicating the monitoring result each other.

Therefore, the CDMA cellular radio-communication system executes the so-called transmission power control with the purpose that the influence of interference components can be reduced without increasing the transmission power of undesired waves serving as interference components for other stations by performing communication with the minimum necessary transmission power.

Actually, the CDMA cellular radio-communication system detects the ratio between the desired-wave power when receiving a transmission signal from a portable telephone at a base station and the sum of the energy and thermal noises of interference components received by the base station (the sum is hereafter referred to as interference-wave power), that is, the signal-to-interference-wave-power ratio C/I and controls the detection result so that it becomes a value capable of withstanding a desired communication quality.

Moreover, in the case of the CDMA cellular radio-communication system, interference components produced due to calls generated in adjacent cells are averaged and provided for the calls in all cells in a local station so as to slowly influence them but only a specific call generated in a cell of the local station is not entirely influenced by the interference components. Thereby, the interference components produced due to calls generated in adjacent cells are determined as a certain averaged value. Therefore, when the transmission power in the cells of the local station increases up to a degree capable of ignoring the influence of interference components, it is possible to perform communication with no problem even if using the same frequency band in the base station of adjacent cells.

Therefore, the CDMA cellular radio-communication system is a communication system assuming that the energy of interference components received by a base station can be recognized to be almost constant (an averaged value) without instantaneously greatly fluctuating. Therefore, if the energy of interference components received by the base station greatly fluctuates, a portable telephone communicating with the base station must greatly fluctuate the transmission power.

Therefore, when the energy of interference component received by a base station suddenly increases, a portable telephone must increase the transmission power by a value corresponding to the increase of the energy. However, a portable telephone is constituted so as to increase the transmission power in accordance with a power-up command sent from a base station if the energy of interference components extremely suddenly increases. Therefore, a time lag occurs before the transmission power is actually increased after receiving the power-up command and as a result, the communication between the base station and the portable telephone may be instantaneously broken.

In the case of an actual CDMA cellular radio-communication system, the transmission rate per user is approx. 14K[bit/sec] at most and the transmission rate is transmitted at a bandwidth of 1.23[MHz]. In this case, the rate occupied by a channel assigned to one user for a bandwidth of 1.23[MHz] (the rate is hereafter referred to as process gain) is approx. 87 (=1.23[MHz]/14K[bit/sec]) and the fluctuation of calls for one channel (whether the fluctuation occurs) does not have a great influence on the entire system.

However, to transmit an information bit stream having a transmission rate of 400K[bit/sec] at a bandwidth of, for example, 4[MHz], the process gain reaches 10 (=4[MHz]/400[bit/sec]) and thus, the influence of fluctuation of calls for one channel on the entire system cannot be ignored. Similarly, to transmit an information bit stream having a transmission rate of 800[bit/sec] at a bandwidth of, for example, 4[MHz], it is no longer possible to operate the system without considering the influence of fluctuation of calls for one channel on the entire system.

In the above case, if communication is suddenly started at a transmission rate desired by a user from the beginning of establishment of a communication channel (that is, if the rate of channels used among communication channels of the entire system is high), the transmission power must be increased correspondingly to the number of channels used. Thereby, a problem occurs that the interference value suddenly increases to affect other types of communication. Moreover, in this case, a time lag occurs in a mobile station before the transmission power is increased correspondingly to a power-up command sent from a base station. Thereby, a problem occurs that the communication between the base station and a portable telephone is instantaneously broken.

The same is true for a TDMA cellular radio-communication system for performing frequency hopping independently of a CDMA cellular radio-communication system. Therefore, when suddenly starting communication at a transmission rate desired by a user from the beginning of the establishment of a communication channel, problems occur that the interference value suddenly increases and the communication between a base station and a portable telephone is instantaneously broken because power control for controlling the increasing interference value cannot follow.

SUMMARY OF THE INVENTION

In view of the foregoing, an object of this invention is to provide a transmission method, a transmitter and a receiver capable of performing communication without affecting other types of communication even under a communication environment using the same frequency band for adjacent cells.

The foregoing object and other objects of the invention have been achieved by the provision of a transmission method, a transmitter, and a receiver, in which a transmission symbol series is generated by applying predetermined modulation processing to an encoded bit series obtained by encoding an information bit series of a predetermined transmission rate and a transmission signal generated by applying predetermined transmission processing to the transmission symbol series is transmitted through a predetermined communication channel, a transmission-information bit series of a transmission rate lower than a predetermined transmission rate is generated in accordance with an information bit series, the transmission of the transmission signal generated in accordance with the transmission-information bit series is started through a communication channel, the low transmission rate of the transmission-information bit series is stepwise increased to make the rate reach a predetermined transmission rate, and transmission is performed while stepwise increasing the number of communication channels to be used in accordance with the stepwise increase of the low transmission rate.

By performing transmission with the number of channels corresponding to a low transmission rate at the beginning of start of transmission of a transmission signal and performing transmission while stepwise increasing the number of channels as the transmission rate is slowly stepwise increased, it is possible to prevent the transmission power from suddenly increasing from the beginning of start of transmission.

Moreover, in the case of the present invention, a receiver for generating a transmission symbol series by applying predetermined modulation processing to an encoded bit series obtained by encoding an information bit series of a predetermined transmission rate, generating a transmission signal by applying predetermined transmission processing to the transmission symbol series, and receiving a transmission signal transmitted through a predetermined transmission channel is provided with receiving means for receiving a transmission signal transmitted while a transmission-information bit series of a transmission rate lower than a predetermined transmission rate is generated in accordance with an information bit series, transmission of a transmission signal generated in accordance with the transmission-information bit series is started through a communication channel, the low transmission rate of the transmission-information bit series is stepwise increased to reach a predetermined transmission rate, and the number of communication channels to be used in accordance with the stepwise increase of the low transmission rate is stepwise increased in accordance with channels corresponding to the number of channels of the transmission signal, demodulating means for generating a reception symbol series by applying predetermined demodulation processing to each reception signal received by the receiving means, and storing means for storing and outputting a reception bit series obtained by applying predetermined decoding to a reception symbol series.

Because of performing demodulation and decoding after receiving data by arranging the number of channels at the reception side in accordance with the number of channels increased correspondingly to the stepwise increase of a low transmission rate at the transmission side, it is possible to accurately restore a transmitted transmission signal.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the invention will be described with reference to the accompanying drawings:

(1) First Embodiment

Figure 1:
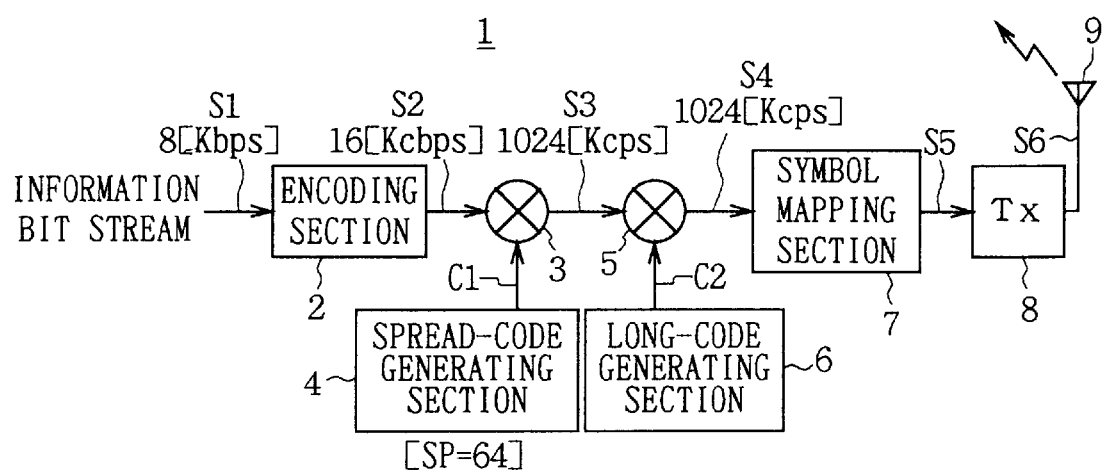
FIG. 1 is a block diagram showing the structure of a transmitter in a conventional DS-CDMA cellular radio-communication system.
Figure 2:
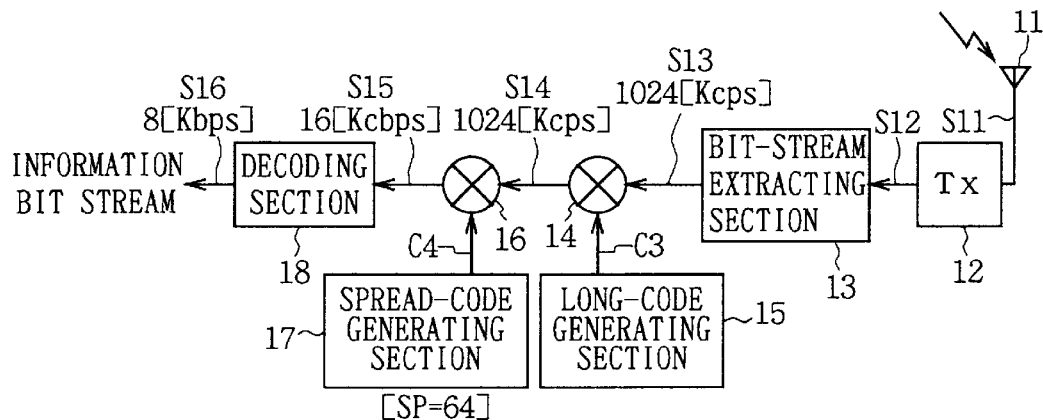
FIG. 2 is a block diagram showing the structure of a receiver in a conventional DS-CDMA cellular radio-communication system.
Figure 3:
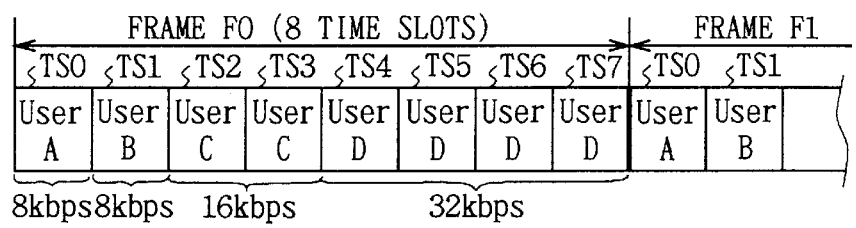
FIG. 3 is a schematic diagram for explaining multislot assignment for a conventional TDMA cellular radio-communication system.
Figure 4:
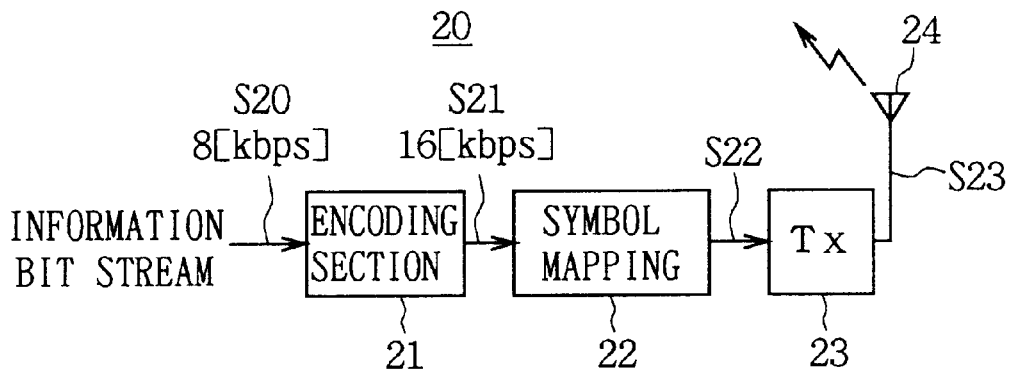
FIG. 4 is a block diagram showing the structure of a transmitter in a conventional TDMA cellular radio-communication system.
Figure 5:
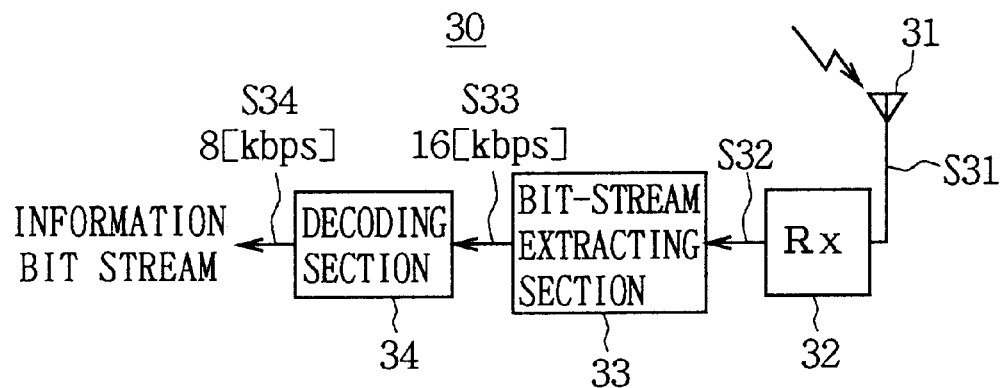
FIG. 5 is a block diagram showing the structure of a receiver in a conventional TDMA cellular radio-communication system.
Figure 6:
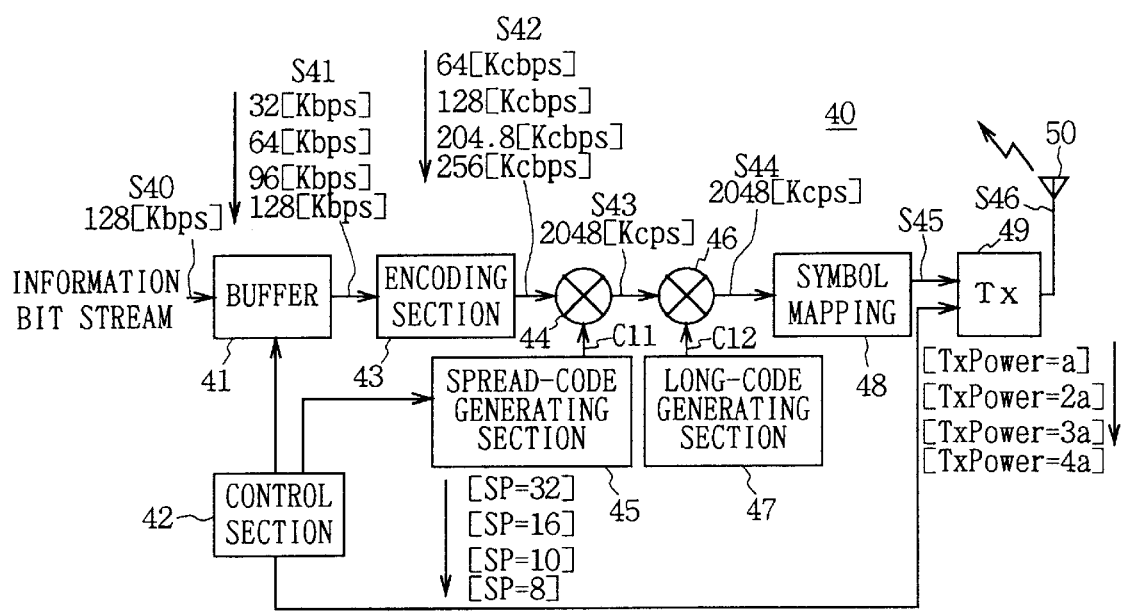
FIG. 6 is a block diagram showing the structure of a transmitter in the DS-CDMA cellular radio-communication system of the first embodiment of the present invention.

In the case of the present invention, the down communication to be performed from a base station to a portable telephone is described as an example. In FIG. 6, symbol 40 denotes a transmitter of the present invention mounted on a base station as a whole, in which a communication environment using the same frequency band for all adjacent cells, that is, a state in which the number of repetitions of frequency is "1" is set so that an information bit stream S40 is transmitted at a bit rate of 128K[bit/sec] desired by a user by using a bandwidth of 2.048[MHz]. Because the information bit stream S40 transmitted by the user has a high bit rate of 128K[bit/sec], it is possible to communicate not only audio data but also other data at a high speed.

The transmitter 40 first transmits the information bit stream S40 to a buffer 41. The buffer 41 temporarily stores the input information bit stream S40, reads information bit streams S41 while stepwise increasing a bit rate every predetermined time interval and every predetermined number of bits in accordance with a control signal supplied from a control section 42, and successively transmits the information bit streams S41 to an encoding section 43.

In this case, the control section 42 monitors the read time of the information bit streams S41 read out of the buffer 41 with a clock provided for the inside of the section 42 so as to read from the buffer 41 information bit streams S41 having a bit rate at the next stage when the read time elapses by a predetermined value.

The encoding section 43 generates a transmission symbol stream S42 by applying the convolutional encoding to the information bit streams S41 input whenever the predetermined time elapses and having bit rates different from each other and. interleaving a transmission symbol obtained as the result of the convolutional encoding and successively transmits the streams S42 to a spread-code multiplier 44.

The spread-code multiplier 44 receives a spread code Cll having an optimum spreading ratio (SP) from a spread-code generating section 45 in accordance with a control signal supplied from the control section 42, generates a transmission symbol stream S43 of 204K[chip/sec] by multiplying each of the transmission symbol streams S42 having bit rates different from each other by the spread code C11 having an optimum spreading ratio, and transmits the stream S43 to a long-code multiplier 46.

The long-code multiplier 46 performs scrambling by multiplying the transmission symbol stream S43 by a long code C12 supplied from a long-code generating section 47 and intrinsically provided for each base station so that no crosstalk occurs due to the same spread code C11 used for adjacent cells, and transmits a transmission symbol stream S44 of 204K[chip/sec] obtained as the result of the scrambling to a symbol mapping section 48.

In this case, because the number of repetitions of frequency is "1," the same frequency band is used between adjacent cells. Moreover, because the same frequency band is used for the spread code C11, the interference between adjacent cells is prevented by using the long code C12 intrinsically provided for each base station. That is, in the case of a CDMA cellular radio-communication system of the present invention, though the spread codes C11 used for each portable telephone are orthogonal to each other in the same cell, they are not always orthogonal to each other between adjacent cells because the same spread codes C11 are also used between the adjacent cells.

The symbol mapping section 48 generates a transmission signal S45 showing each piece of symbol information with a phase value by applying the BPSK modulation processing to the input transmission symbol stream S44 and transmits the signal S45 to a transmitting circuit 49.

The transmitting circuit 49 generates a transmission signal S46 of a predetermined frequency channel by filtering the transmission signal S45 and thereafter, converting the signal S45 into an analog signal and multiplying the transmission signal converted into the analog signal by a high-frequency signal, and thereby frequency-converting the transmission signal into a desired frequency band (e.g. approx. 800 [MHz]), amplifies the signal S46 to a predetermined power, and then transmits the signal S46 through an antenna 50.

In this case, the control section 42, instead of reading the information bit stream S40 of 128K[bit/sec] from the buffer 41 at the original bit rate to apply encoding of the next stage downward, first reads the information bit stream S41 at a bit rate of 32K[bit/sec] to transmit it to the encoding section 43, then reads the information bit stream S41 at a bit rate of 64K[bit/sec] when predetermined time elapses, then reads the information bit stream S41 at a bit rate of 96K[bit/sec] when predetermined time elapses, and then reads the information bit stream S41 at a bit rate of 128K[bit/sec] when predetermined time elapses.

Therefore, the encoding section 43 generates an information bit stream S42 of 64K[coded bit/sec] by encoding the information bit stream S41 of 32K[bit/sec] at an encoding rate of ½ and supplies the stream S42 to the spread-code multiplier 44. Then, the encoding section 43 generates an information bit stream S42 of 128K[coded bit/sec] by encoding the information bit stream S41 of 64K[bit/sec] input after predetermined time elapses at an encoding rate ½ and supplies the stream S42 to the spread-code multiplier 44.

Moreover, the encoding section 43 generates an information bit stream S42 of 204.8K[coded bit/sec] by encoding the information bit stream S41 of 96K[bit/sec] input after predetermined time further elapses at an encoding rate of approx. ½ and supplies the stream S42 to the spread-code multiplier 44, and generates an information bit stream S42 of 256K[coded bit/sec] by encoding the information bit stream S41 of 128K[bit/sec] further input after predetermined time further elapses at an encoding rate of ½ and supplies the stream S41 to the spread-code multiplier 44.

Thus, the encoding section 43 generates the transmission symbol streams S42 whose bit rates are stepwise increased every 64K[coded bit/sec] by convolution-encoding and interleaving the information bit streams S41 whose bit rates are increased every predetermined time interval and successively supplies the streams S42 to the spread-code multiplier 44 every predetermined time interval.

When the information bit stream S42 of 64K[coded bit/sec] is input to the spread-code multiplier 44, the multiplier 44 receives the spread code C11 at a spreading ratio (SP) of 32 from the spread-code generating section 45 in accordance with a control signal output from the control section 42 and generates a transmission symbol stream S43 of 2048K[chip/sec] by multiplying the information bit stream S42 of 64K[coded bit/sec] by the spread code C11 at an SP of 32.

In this case, the spread-code multiplier 44 assigns the same frequency band to 32 channels by using the spread code C11 at a spreading ratio (SP) of 32. Therefore, the rate occupied by one channel is small among 32 channels.

Then, when the information bit stream S42 of 128K [coded bit/sec] is input to the spread-code multiplier 44, the multiplier 44 receives the spread code C11 at a spreading ratio (SP) of 16 from the spread-code generating section 45 in accordance with a control signal output from the control section 42 and generates a transmission symbol stream S43 of 204K[chip/sec] by multiplying the information bit stream S42 of 128K[coded bit/sec] by the spread code C11 at an SP of 16.

In this case, the spread-code multiplier 44 assigns the same frequency band to 16 channels by using the spread code C11 at a spreading ratio (SP) of 16. Therefore, the rate occupied by one channel among 16 channels is further increased compared to the case of using the spread code C11 at a spreading rate (SP) of 32.

Similarly, when the information bit stream S42 of 2048K [coded bit/sec] is input to the spread-code multiplier 44, the multiplier 44 generates a transmission symbol stream S43 of 2048K[chip/sec] by multiplying the information bit stream S42 of 2048K[coded bit/sec] by the spread code C11 at a spreading ratio (SP) of 10. Moreover, when the information bit stream S42 of 256K[coded bit/sec] is input to the multiplier 44, the multiplier 44 generates a transmission symbol stream S43 of 2048K[chip/sec] by multiplying the information bit stream S42 of 256K[coded bit/sec] by the spread code C11 at a spreading ratio (SP) of 8.

In this case, the spread-code multiplier 44 assigns the same frequency band to 8 channels by using the spread code C11 at a spreading ratio (SP) of 8. Therefore, the rate occupied by one channel among 8 channels is further increased compared to the case of using the spread code C11 at a spreading ratio (SP) of 32 or 16.

Moreover, the control section 42 stepwise increases transmission power by controlling the transmitting circuit 49. When reading the information bit stream S41 of 32K[bit/sec] from the buffer 41, the section 42 transmits the transmission signal S45 generated by encoding, spreading, and symbol-mapping the signal S45 with a transmission power "a." Then, when reading the information bit stream S41 of 64K[bit/sec] from the buffer 41, the control section 42 transmits the transmission signal S45 with a transmission power "2a."

Then, when reading the information bit stream S41 of 96K[bit/sec] from the buffer 41, the control section 42 transmits the transmission signal S45 with a transmission power "3a." When reading the information bit stream S41 of 128K[bit/sec] from the buffer 41, the section 42 transmits the transmission signal S45 with a transmission power "4a."

Figure 7:
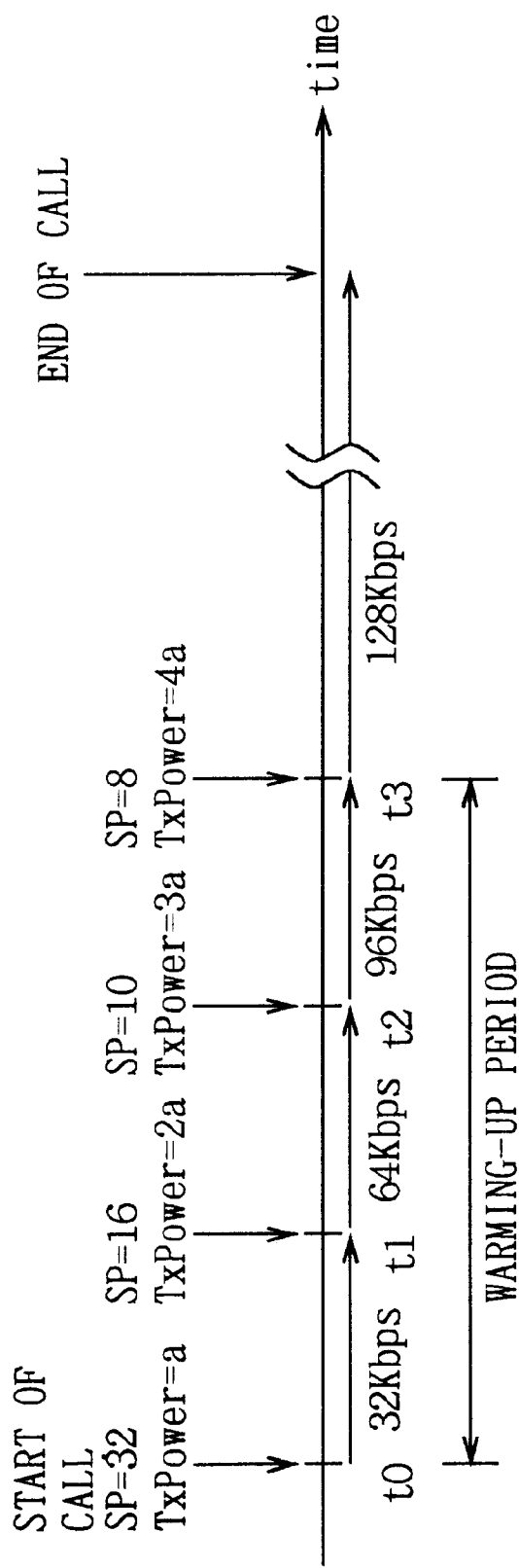
FIG. 7 is a time chart showing the transition of a transmission rate in the DS-CDMA cellular radio-communication system of the first embodiment of the present invention.

Thus, the control section 42, instead of transmitting the information bit stream S40 by encoding it at a bit rate of 128K[bit/sec] desired by a user, classifies the stream S40 into four levels (t0 to t3) as shown in FIG. 7, finally encodes and spreads the stream S40 at a desired bit rate of 128K [bit/sec] while stepwise increasing a bit rate, and transmits the transmission signal S46 while stepwise increasing transmission power as the rate occupied by one channel among all channels increases correspondingly to the bit rate at each level.

In this case, a control signal is transferred between a base station and a portable telephone as a warming-up period before the bit rate of the information bit stream S41 read from the buffer 41 reaches 128K[bit/sec]. However, to transmit the data for which a real-time property is not requested, it is possible to transmit an actual information bit stream from the beginning by using the warming-up period.

Figure 8:
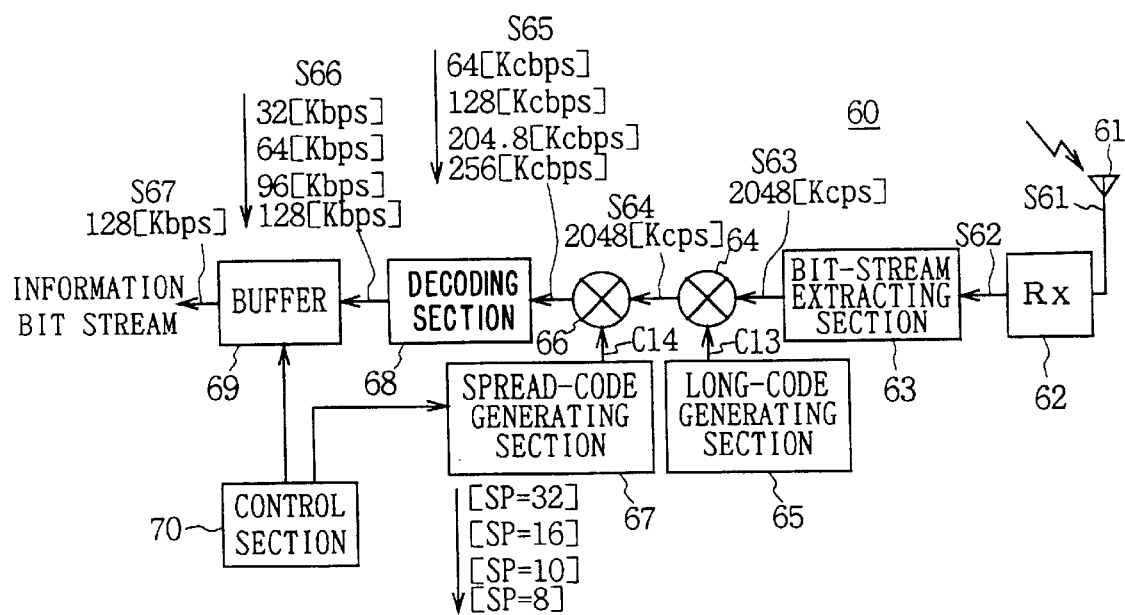
FIG. 8 is a block diagram showing the structure of a receiver in the DS-CDMA cellular radio-communication system of the first embodiment of the present invention.

Moreover, as shown in FIG. 8, symbol 60 denotes a receiver of the present invention mounted on a portable telephone, which receives the transmission signal S46 transmitted from the transmitter 40 through an antenna 61 and inputs the signal S46 to a receiving circuit 62 as a reception signal S61. The receiving circuit 62 amplifies the reception signal S61 up to a predetermined level and thereafter, fetches a base-band signal by frequency-converting the signal S61 and fetches the BPSK-modulated reception signal S62 by filtering the base-band signal and thereafter converting the signal S62 into a digital signal, and transmits the signal S62 to a bit-stream extracting section 63.

The bit-stream extracting section 63 fetches symbol information by applying the BPSK demodulation processing to the reception signal S62 and transmits the information to a long-code multiplier 64 as a reception symbol stream S63 of 2048K[chip/sec].

The long-code multiplier 64 receives a long code C13 same as that generated by the long-code generating section 47 at the transmission side from a long-code generating section 65 and performs descrambling by multiplying the reception symbol stream S63 by the long code C13. Thereby, the long-code multiplier 64 generates a reception symbol stream S64 of 2048K[chip/sec] same as the transmission symbol stream S43 generated at the transmission side and transmits the stream S64 to a spread-code multiplier 66.

The spread-code multiplier 66 generates a spread code C14 having the same spreading ratio as the spread code C11 generated by the spread-code generating section 45 at the transmission side with a spread-code generating section 67, performs reverse-spreading by multiplying the reception symbol stream S64 by the spread code C14, and transmits a reception symbol stream S65 thus obtained to a decoding section 68.

In this case, the spread-code generating section 45 supplies the spread code C14 by changing spreading ratios of the spread code C14 in accordance with a control signal supplied from a control section 70. Thereby, a receiver 60 generates reception symbol streams S65 having the same bit rate as the case of performing encoding at the transmission side by multiplying the reception symbol stream S64 by the spread codes C14 having spreading ratios different from each other.

In this case, the spread-code multiplier 66 performs reverse-spreading by changing spreading ratios (BP) as the rate occupied by one channel among all channels increases similarly to the case of the transmission side. Thereby, demodulation is accurately performed by following the change of the ratios occupied by one channel similarly to the case of the transmission side.

The decoding section 68 generates information bit streams S66 having the bit rate when read from the buffer 41 at the transmission side by deinterleaving reception symbol streams S65 successively input, maximum-likelihood-series-estimating the receptions symbol streams as the result of the deinterleaving and thereby soft-decision-Viterbi-decoding the reception symbol streams and stores the streams in a buffer 69. The buffer 69 restores transmitted data by reading an information bit stream S67 at a bit rate of 128K[bit/sec] in accordance with a control signal supplied from the control section 70.

In this connection, the present invention performs spreading and reverse-spreading by using the spread codes C11 and C14 orthogonal to each other when performing the down communication from a base station to a portable telephone. However, when performing the up communication from the portable telephone to the base station, the present invention performs spreading and reverse-spreading by using codes not orthogonal to each other and intrinsic to a terminal.

In the case of the above structure, when the transmitter 40 encodes and spreads the information bit stream S40 to be transmitted at a bit rate of 128K[bit/sec] desired by a user from the beginning, the spread code C11 at an optimum spreading ratio (SP) of 8 is assigned to the encoded transmission symbol stream S42 of 256K[coded bit/sec].

In this case, because the spreading ratio of the transmitter 40 decreases (spreading ratio=8), the rate (process gain= 2.048[MHz]/256K[bit/sec]) occupied by the number of channels assigned to one user to all channels (in this case, 8 channels) having a bandwidth of 2.048[MHz] increases and thereby, a large transmission power "4a" is necessary. Therefore, the transmitter 40 affects other types of communication of the entire system because the transmission power when calls for one channel are generated increases and thereby, interference components are increased.

Figure 9:
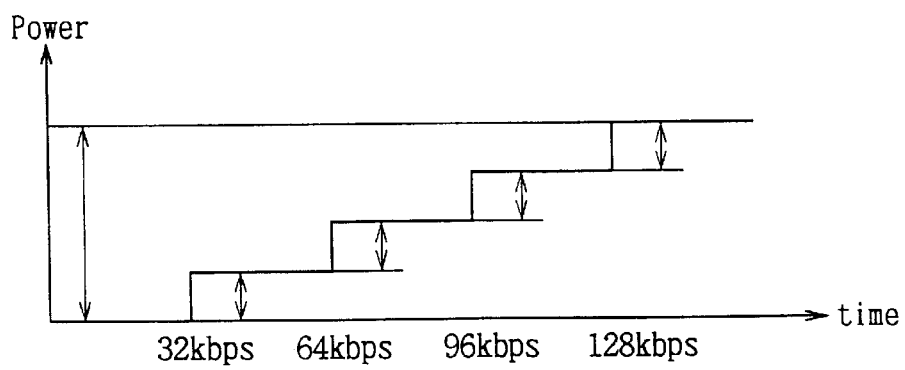
FIG. 9 is a schematic diagram showing the transition of transmission power for the first embodiment of the present invention.

Moreover, the transmitter 40, instead of encoding and spreading the information bit stream S40 at a desired bit rate of 128K[bit/sec] from the beginning, transmits the stream S40 in accordance with the number of channels corresponding to the bit rate for each level while stepwise increasing the bit rate every 32 K[bit/sec]. Thereby, as shown in FIG. 9, it is possible to stepwise transmit the stream S40 by the necessary enough transmission power corresponding to the bit rate for each level and thus, it is possible to stepwise increase the transmission power.

Thereby, in the case of the transmitter 40, by transmitting a call while stepwise increasing transmission power without suddenly transmitting the call at a large transmission power when generating the call, it is possible to prevent interference components to be given to other types of communication from suddenly increasing. As a result, the transmitter 40 can prevent a time lag before the transmission power is increased from occurring because a temporal delay is produced before increasing the transmission power in accordance with a power control command and thereby, it is possible to prevent a call from instantaneously breaking between a base station and a portable telephone.

Moreover, because of stepwise and linearly increasing a bit rate every 32K[bit/sec], the transmitter 40 only stepwise increases interference components little by little and thereby, it is possible to minimize the influence of interference waves on other types of communication.

According to the above structure, the transmitter 40 can prevent transmission power from being suddenly increased due to occurrence of a call by starting transmission with the number of channels corresponding to an information bit stream at a low bit rate at the beginning of establishment of the call and stepwise increasing the number of channels used correspondingly to the increase of the bit rate. Thus, it is possible to prevent interference components produced due to occurrence of a call from suddenly increasing and perform communication without affecting other types of communication even under a communication environment in which the number of repetitions of frequency is "1."

(2) Second Embodiment

Figure 10:
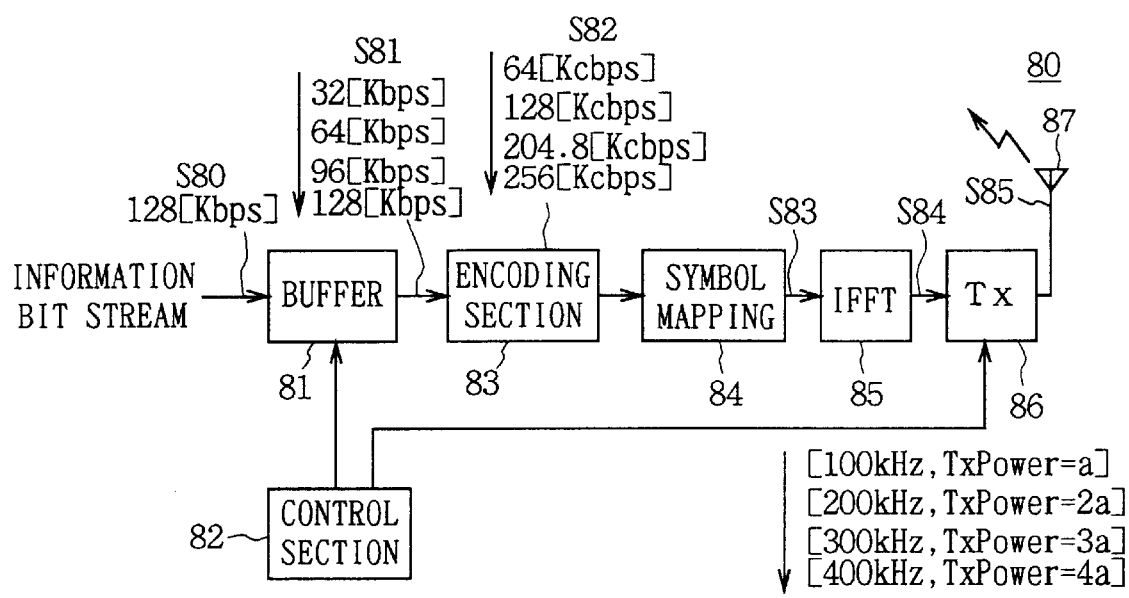
FIG. 10 is a block diagram showing the structure of a transmitter in the multicarrier-communication cellular radio-communication system of the second embodiment of the present invention.

In FIG. 10, symbol 80 denotes a transmitter of the present invention according to a multicarrier communication system as a whole. Also in FIG. 10, it is assumed that a communication environment is using the same frequency band for all adjacent cells, that is, a state in which the number of repetitions of frequency is "1" is set and the entire bandwidth of 3.2[MHz] is used, and the communication of 32K[bit/sec] can be executed at a bandwidth of 100[KHz] constituted with 24 subcarriers. In this case, because an information bit stream S80 to be transmitted by a user has a high bit rate of 128K[bit/sec], it is possible to communicate not only audio data but also other data at a high speed.

The transmitter 80 first transmits the information bit stream S80 to a buffer 81. The buffer 81 temporarily stores the input information bit stream S80, reads information bit streams S81 while stepwise increasing a bit rate every predetermined time interval and every predetermined number of bits in accordance with a control signal supplied from a control section 82, and successively transmits the streams' S81 to an encoding section 83.

In this case, the control section 82 monitors the read time of the information bit streams S81 read from the buffer 81 by a clock provided inside of the section 82. When the read time elapses by a predetermined value, the section 82 reads the information bit streams S81 having the next-level bit rate from the buffer 81.

The encoding section 83 generates transmission symbol streams S82 by applying convolutional encoding to the information bit streams S81 input whenever predetermined time elapses and having bit rates different from each other and interleaving transmission symbols obtained as the result of the convolutional encoding and successively transmits the streams S82 to a symbol mapping section 84.

The symbol mapping section 84 generates a transmission signal S83 in which each piece of symbol information is shown by a phase value by classifying the input transmission symbol streams S82 every predetermined number of bits in order to assign them to transmission slots TX and applying the BPSK modulation processing to transmission symbol streams obtained as the result of the classification and transmits the streams S83 to an inverse-fast-Fourier-transforming (IFFT) section 85.

The inverse-fast-Fourier-transforming section 85 disperses and superimposes the symbols of the transmission signals S83 to and on pluralities of subcarriers whose frequencies are separate from each other by a predetermined interval (arranges the symbols on a frequency axis) by applying the inverse Fourier transform processing to generate a transmission signal constituted with pluralities of subcarriers. Thereby, a transmission signal is generated in which symbols arranged on a time base and input are arranged on a frequency axis.

Moreover, the inverse-fast-Fourier-transforming section 85 randomizes phase values of subcarriers constituting a transmission signal by supplying random phase values generated in accordance with a predetermined rule on the basis of an initial phase value to the phases of the subcarriers, applies windowing to the symbol group of a transmission signal S84, and thereby controls unnecessary out-of-band spurious (performs pulse shaping). Specifically, the windowing is realized by applying a cosine roll-off filter to the symbol group constituting the transmission signal S84 on a time base.

A transmitting circuit 86 generates a transmission signal S85 of a predetermined frequency channel by filtering the transmission signal S84, thereafter converting the signal S84 into an analog signal, multiplying the transmission signal converted into the analog signal by a high-frequency signal, and thereby frequency-converting the transmission signal into a desired frequency band (e.g. approx. 800[MHz]), amplifies the signal S85 up to a predetermined power, and then transmits the signal S85 through an antenna 87.

Moreover, the transmitting circuit 86 changes frequency channels to be used at random every slot in accordance with a predetermined pattern so as to reduce the influence of interference waves received from other type of communication. Thus, the transmitter 80 performs the multicarrier communication for transmitting the information bit stream S80 to be transmitted with pluralities of subcarriers by dispersing and superimposing transmission signals classified in slots to and on the subcarriers.

In this case, the control section 82, instead of reading the information bit stream S80 of 128K[bit/sec] from the buffer 81 at the original bit rate and performing encoding at the next stage downward, first reads the information bit stream S81 at a bit rate of 32K[bit/sec] and transmits the stream S81 to the encoding section 83, then reads the information bit stream S81 at a bit rate of 64K[bit/sec] when predetermined time elapses, then reads the information bit stream S81 at a bit rate of 96K[bit/sec] when predetermined time elapses, and reads the information bit stream S81 at a bit rate of 128K[bit/sec] when predetermined time elapses.

Therefore, the encoding section 83 generates an information bit stream S82 of 64K[coded bit/sec] by encoding the information bit stream S81 of 32K[bit/sec] at an encoding rate of ½ and transmits the stream S82 to the symbol mapping section 84. Then, the encoding section 83 generates an information bit stream S82 of 128K[coded bit/sec] by encoding the information bit stream S81 of 64K[bit/sec] input after predetermined time elapses at an encoding rate of ½ and supplies the stream S82 to the symbol mapping section 84.

Then, the encoding section 83 generates an information bit stream S82 of 192K[coded bit/sec] by encoding the information bit stream S81 of 96K[bit/sec] input after predetermined time further elapses at an encoding rate of ½, supplies the stream S82 to the symbol mapping section 84, and moreover generates an information bit stream S82 of 256K[coded bit/sec] by encoding the information bit stream S81 of 128K[bit/sec] input after predetermined time still further elapses at an encoding rate of ½ and supplies the stream S82 to the symbol mapping section 84.

Thus, the encoding section 83 generates information bit streams S82 in which the bit rate is stepwise increased every 64K[coded bit/sec] by convolution-encoding and interleaving the information bit streams S81 in which the bit rate is increased every predetermined time interval and successively supplies the streams S82 to the symbol mapping section 84 every predetermined time interval.

Moreover, the control section 82 stepwise increases transmission power by controlling the transmitting circuit 86. When reading the information bit stream S81 of 32K[bit/sec] from the buffer 81, the control section 82 transmits the transmission signal S84 generated by encoding, spreading, and symbol-mapping the signal S84 by the transmission power "a" through a communication channel having a bandwidth of 100[KHz].

Moreover, when reading the information bit stream S81 of 64K[bit/sec] from the buffer 81, the control section 82 transmits the transmission signal S84 by a transmission power "2a" through a communication channel having a bandwidth of 200[KHz] (communication channel having a bandwidth of 100[KHz](2). When reading the information bit stream S81 of 96K[bit/sec] from the buffer 81, the control section 82 transmits the transmission signal S84 by a transmission power "3a" through a communication channel having a bandwidth of 300[KHz] (communication channel having a bandwidth of 100[KHz](3). When reading the information bit stream S81 of 128K[bit/sec] from the buffer 81, the control section 82 transmits the transmission signal S84 by a transmission power "4a" through a communication channel having a bandwidth of 400[KHz] (communication channel having a bandwidth of 100[KHz](4).

Thus, the control section 82 can perform high-speed transmission by spreading a bandwidth (100 to 400[KHz]) in accordance with the bit rate of the information bit stream S81 read from the buffer 81 (that is, by increasing the number of channels to be used among all communication channels) and thereby transmitting the stream S81. Moreover, because the transmitting circuit 86 performs transmission by using a bandwidth of 100 to 400[KHz], it performs transmission after performing the filtering of 100 to 400[KHz] every bandwidth.

Figure 11:
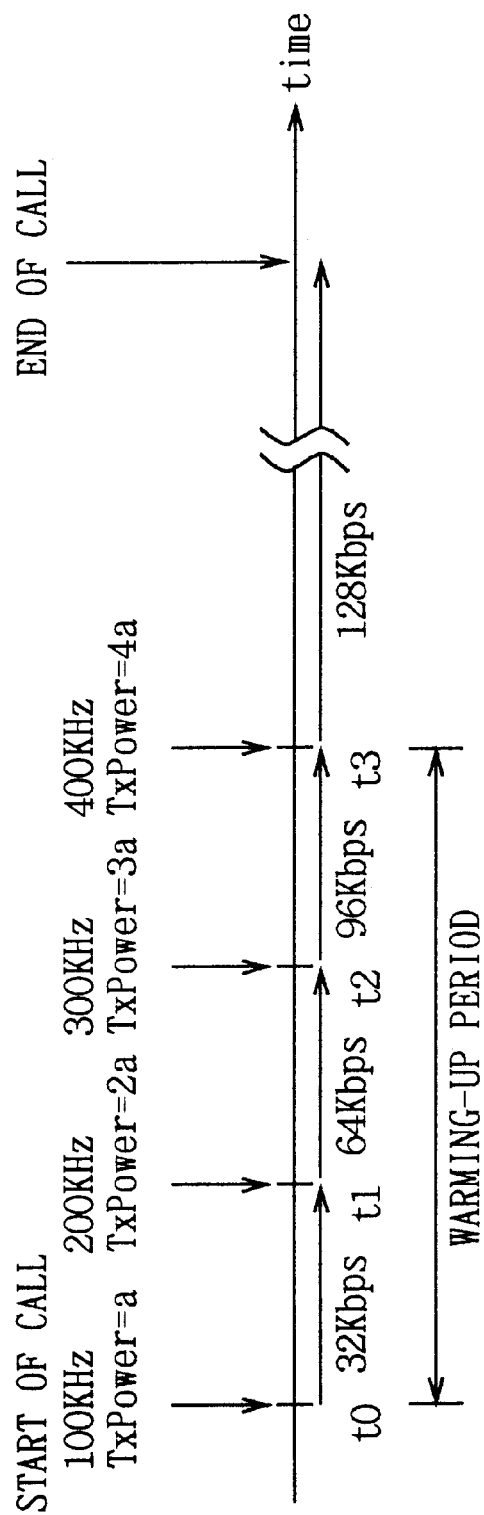
FIG. 11 is a time chart showing the transition of transmission rates for the multicarrier-communication cellular radio-communication system of the second embodiment of the present invention.

Thus, the control section 82, instead of encoding and transmitting the information bit stream S80 at a bit rate of 128K[bit/sec] desired by a user from the beginning, finally encodes the stream S80 at a bit rate of 128K[bit/sec] while dividing the stream S80 into four levels (t0 to t3) as shown in FIG. 11 and stepwise increasing the bit rate and transmits the transmission signal S85 by a transmission power corresponding to the number of channels while increasing the channels correspondingly to the bit rate for each level.

Also in this case, control signals are transferred between a base station and a portable telephone as a warming-up period before the bit rate of the information bit stream S81 read from the buffer 81 reaches 128K[bit/sec]. However, to transmit the data for which a real-time property is not requested, it is also possible to transmit an actual information bit stream by using the warming-up period from the beginning.

Figure 12:
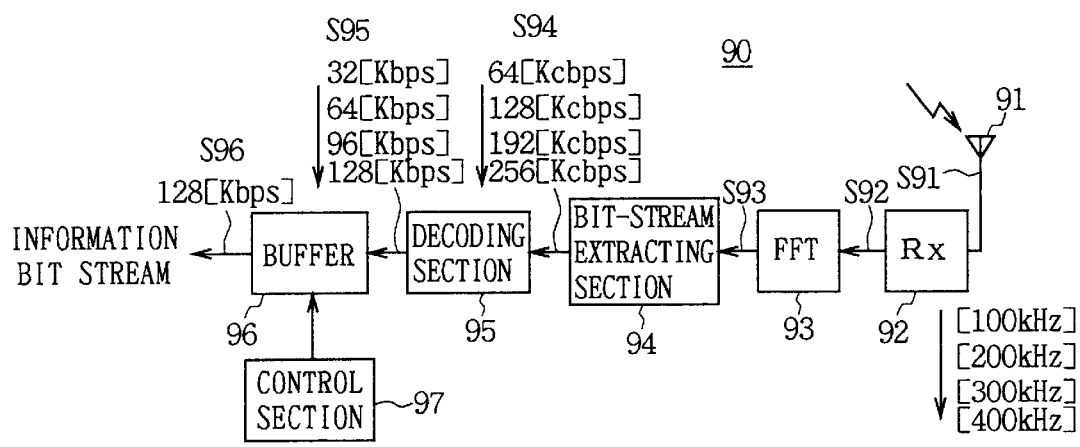
FIG. 12 is a block diagram showing the structure of a receiver in the multicarrier-communication cellular radio-communication system of the second embodiment of the present invention.

Moreover, as shown in FIG. 12, symbol 90 denotes a receiver of the present invention, which receives the transmission signal S85 transmitted from the transmitter 80 through an antenna 91 and inputs the signal S85 to a receiving circuit 92 as a reception signal S91. The receiving circuit 92 fetches a base-band signal by amplifying the reception signal S91 up to a predetermined level and thereafter, frequency-converting the signal S91, fetches a BPSK-modulated reception signal S92 by filtering the base-band signal and thereafter, converting the signal S92 into a digital signal, and transmits the signal S92 to a fast-Fourier-transforming section 93.

In this case, the receiving circuit 92 changes frequency channels received in accordance with a hopping pattern same as that of the frequency hopping performed at the transmission side and receives the transmission signal S85 at the number of channels equal to that of the transmission side. Thereby, the receiving circuit 92 can accurately execute the receiving operation by following the frequency channels at the transmission side and the change of the number of channels.

The fast-Fourier-transforming section 93 fetches signal components for one slot by applying windowing to the input reception signal S92, applies the Fourier transform processing to the fetched signal components, fetches a reception signal S93 obtained by arranging a group of symbols arranged on a frequency axis and fetched on a time base and transmits the symbol group to a bit-stream extracting section 94. In this connection, the fast-Fourier-transforming section 93 applies windowing to the reception signal S92 by applying a cosine roll-off filter to the signal S92 on a time base similarly to the case of the inverse-fast-Fourier-transforming section 85 at the transmission side.

The bit-stream extracting section 94 fetches symbol information by applying the BPSK demodulation processing to the reception signal S93 and transmits the symbol information to a decoding section 95 as the reception symbol stream S94.

The decoding section 95 generates an information bit stream S95 having a bit rate when read from the buffer 81 at the transmission side by deinterleaving an input reception symbol stream S94, maximum-likelihood-series-estimating a reception symbol stream obtained as the result of the deinterleaving, and thereby soft-decision-Viterbi-decoding the reception symbol stream and stores the stream S95 in a buffer 96. The buffer 96 restores transmitted data by reading an information bit stream S96 at a bit rate of 128K[bit/sec] in accordance with a control signal supplied from a control section 97.

In the case of the above structure, when transmitting the information bit stream S80 to be transmitted by encoding it at a bit rate of 128K[bit/sec] desired by a user from the beginning, the transmitter 80 transmits the stream S80 by using a bandwidth of 400[KHz] (communication channel having a bandwidth of 100[KHz](4) corresponding to the bit rate of the encoded transmission symbol stream S82 of 256K[coded bit/sec].

Therefore, the rate occupied by the number of channels (4) having a bandwidth of 400[KHz] assigned to one user increases to all channels (32) having the entire frequency bandwidth of 3.2[MHz] and thereby, a large transmission power "4a" is required. In this case, because the transmission power when calls for one channel occur increases and thereby, interference components suddenly increase, the transmitter 80 affects other types of communication of the entire system.

Therefore, the transmitter 80 transmits the information bit stream S80 through the number of channels corresponding to the stepwise increase of a bit rate instead of encoding the stream S80 at a bit rate of 128K[bit/sec] desired by a user from the beginning and transmitting it. Thereby, it is possible to transmit the stream S80 at an optimum transmission power corresponding to the number of channels used and thus, it is possible to stepwise increase transmission power.

Thereby, the transmitter 80 can perform transmission while stepwise increasing transmission power without suddenly performing transmission with a large transmission power when generating a call and resultantly, it is possible to prevent interference components to be given to other types of communication from suddenly increasing. Therefore, the transmitter 80 can avoid a time lag before transmission power is increased because a temporal delay is produced before increasing the transmission power in accordance with a power control command and thereby, it is possible to prevent a call from instantaneously breaking between a base station and a portable telephone.

Moreover, in the case of the transmitter 80, because a bit rate is stepwise and linearly increased every 32K[bit/sec], it is only necessary to stepwise increase interference components little by little. Therefore, it is possible to minimize the influence of interference waves on other types of communication.

Figure 13:
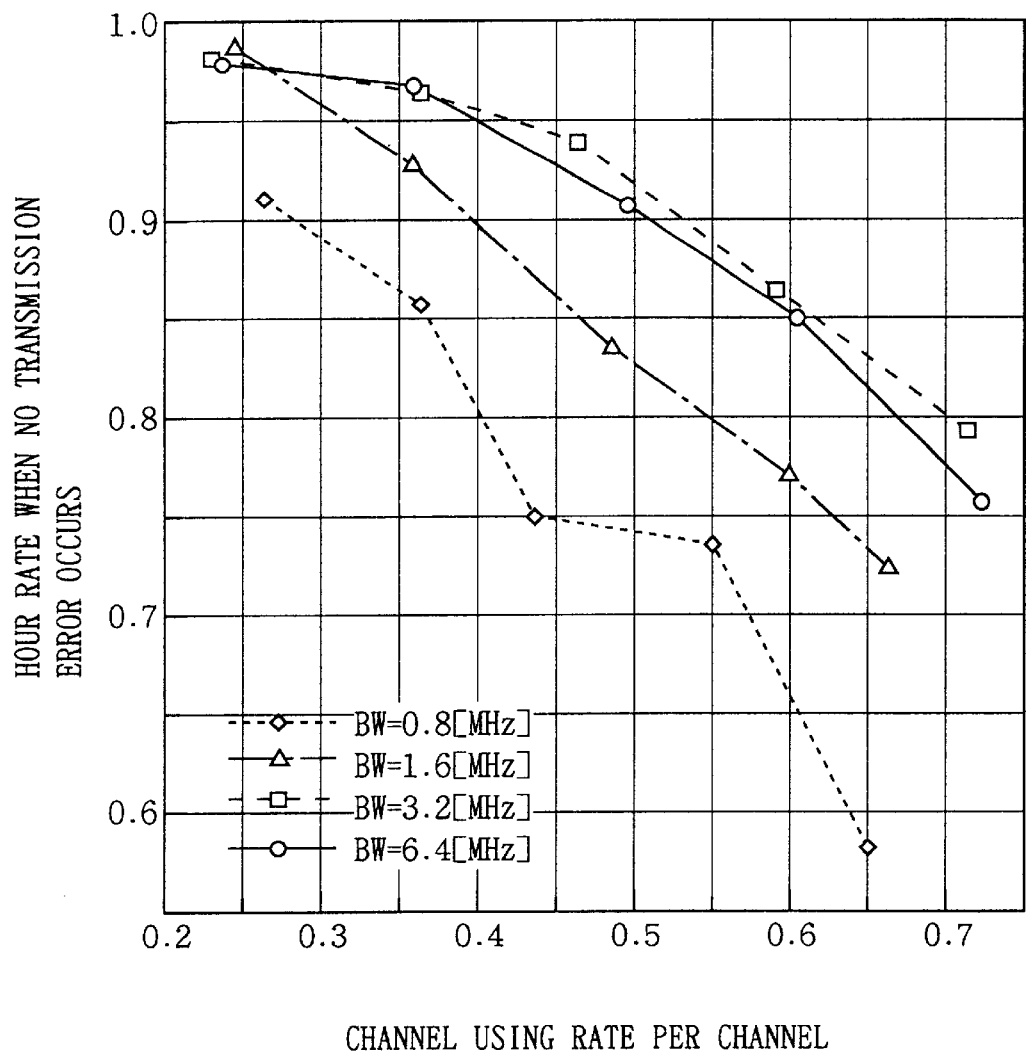
FIG. 13 is a graph showing experiment data for the multicarrier-communication cellular radio-communication system of the second embodiment of the present invention.

Moreover, in the case of the transmitter 80, when the bandwidth per channel assigned when a channel is established is set to 100[KHz] which is approx. 1/32 the frequency bandwidth of 3.2[MHz] of the entire system as shown in FIG. 13, it is clarified through experiments that the rate (y-axis) of the time in which no transmission error occurs is maximized for the channel utilization rate (x-axis) per channel.

Moreover, in the case of the transmitter 80, when the bandwidth per channel assigned when a channel is established is set to 100[KHz] which is approx. 1/64 the frequency bandwidth of 6.4[MHz] of the entire system, an experiment result is obtained which is almost equal to the case of a frequency bandwidth of 3.2[MHz].

Therefore, in the case of the transmitter 80, when the bandwidth of one channel assigned when a channel is established is set to a value approx. 1/32 or less the frequency bandwidth BW of the entire system, it is possible to minimize the influence of interference components given to other types of communication when one communication channel occurs.

According to the above structure, the transmitter 80 can prevent transmission power from being suddenly increased due to occurrence of a call by starting transmission with the number of channels corresponding to an information bit stream having a low bit rate at the beginning of establishment of the call and stepwise increasing the number of channels to be used in accordance with the increase of bit rates and thus, prevent interference components produced due to the occurrence of the call from being suddenly increased and perform communication without affecting other types of communication even under the communication environment of the number of repetitions of frequency of "1."

(3) Third Embodiment

Figure 14:
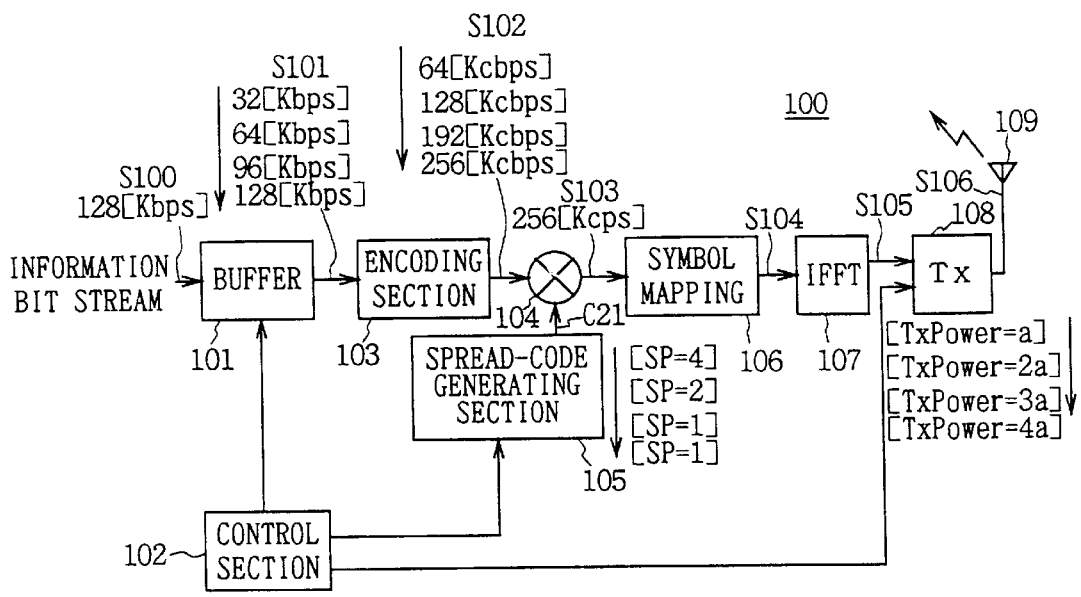
FIG. 14 is a block diagram showing the structure of a transmitter in the multicarrier-communication cellular radio-communication system of the third embodiment of the present invention.

In FIG. 14, symbol 100 denotes a multicarrier-communication transmitter of the present invention as a whole. Also in FIG. 14, a communication environment using the same frequency band for all adjacent cells, that is, a so-called state in which the number of repetitions of frequency is "1" is set and not only audio data but also data can be communicated at a high speed by transmitting an information bit stream S100 of 128K[bit/sec] through a, channel having a bandwidth of 400[KHz] constituted with 96 sub-carriers.

The transmitter 100 first transmits the information bit stream S100 to a buffer 101. The buffer 101 temporarily stores the input information bit stream S100, reads an information bit stream S101 while stepwise increasing a bit rate every predetermined time interval and predetermined number of bits in accordance with a control signal supplied from a control section 102 and transmits the stream S101 to an encoding section 103.

In this case, the control section 102 monitors the read time of the information bit stream S101 read from the buffer 101 by a clock set inside of the control section 102 so as to read the information bit stream S101 having the next-stage bit rate from the buffer 101 when the read time elapses by predetermined time.

The encoding section 103 generates a transmission symbol stream S102 by convolution-encoding the information bit streams S101 input whenever the predetermined time elapses and having bit rates different from each other and interleaving a transmission symbol obtained as the result of the convolutional encoding and transmits the transmission symbol stream S102 to a spread-code multiplier 104.

The spread-code multiplier 104 receives a spread code C21 having an optimum spreading ratio (SP) from a spread-code generating section 105 in accordance with a control signal supplied from the control section 102, generates a transmission symbol stream S103 of 256K[chip/sec] by multiplying the transmission symbol streams S102 having bit rates different from each other by the spread code C21 having the optimum spreading ratio, and transmits the stream S103 to a symbol mapping section 106.

The symbol mapping section 106 generates a transmission signal S104 in which each piece of symbol information is shown by a phase value by BPSK-modulating the input transmission symbol stream S103 and transmits the signal S104 to an inverse-fast-Fourier-transforming (IFFT) section 107.

The inverse-fast-Fourier-transforming section 107 disperses each symbol of the transmission signal S104 into pluralities of subcarriers whose frequencies are separate from each other by a predetermined interval and superimposes them by applying the inverse-fast-Fourier transform to generate a transmission signal constituted with pluralities of subcarriers. Thereby, a transmission signal is generated in which symbols arranged on a time base and input are arranged on a frequency axis.

Moreover, the inverse-fast-Fourier-transforming section 107 randomizes phase values of the subcarriers by adding random phase values generated in accordance with a predetermined rule on the basis of an initial phase value to phases of the subcarriers constituting the transmission signal, applies windowing to the symbol group of the transmission signal S105 thereby obtained, and controls unnecessary out-of-band spurious. Specifically, the windowing is realized by applying a cosine roll-off filter on a time base to the symbol group constituting the transmission signal S105.

A transmitting circuit 108 generates a transmission signal S106 of a predetermined frequency channel by filtering the transmission signal S105, thereafter converting the signal S105 into an analog signal and multiplying a high-frequency signal by the transmission signal converted into the analog signal, and thereby frequency-converting the transmission signal into a desired frequency band (e.g. approx. 800 [MHz]), and amplifies the signal S106 to a predetermined power and thereafter transmits the signal S106 through an antenna 109. Thus, the transmitter 100 performs multi carrier communication for transmitting the information bit stream S100 to be transmitted with pluralities of subcarriers by dispersing the transmission signal into the subcarriers and superimposing them.

In this case, the control section 102, instead of reading the information bit stream S100 of 128[bit/sec] stored in the buffer 101 at the original bit rate and applying the encoding of the next stage downward to the stream S100, first reads the information bit stream S100 at a bit rate of 32K[bit/sec] and transmits the stream S101 to the encoding section 103, then reads the information bit stream S101 at a bit rate of 64K[bit/sec] when predetermined time elapses, then reads the information bit stream S101 at a bit rate of 96K[bit/sec] when predetermined time further elapses, and then reads the information bit stream S101 at a bit rate of 128K[bit/sec] when predetermined time still further elapses.

Therefore, the encoding section 103 generates transmission symbol streams S102 whose bit rates are stepwise increased by convolution-encoding and interleaving the information bit streams S101 whose bit rates are increased every predetermined time interval and successively supplies the streams S102 to the spread-code multiplier 104 every predetermined time interval.

When an information bit stream S102 of 64K[coded bit/sec] is input, the spread-code multiplier 104 receives a spread code C21 having a spreading ratio (SP) of 4 from the spread-code generating section 105 in accordance with a control signal supplied from the control section 102 and generates a transmission symbol stream S103 of 256K[chip/sec] by multiplying the information bit stream S102 of 64K[coded bit/sec] by the spread code C21 having the SP of 4.

Then, when an information bit stream S102 of 128K [coded bit/sec] is input, the spread-code multiplier 104 receives a spread code C21 having a spreading ratio (SP) of 2 from the spread-code generating section 105 in accordance with a control signal supplied from the control section 102 and generates a transmission symbol stream S103 of 256K [chip/sec] by multiplying the information bit stream S102 of 128K[coded bit/sec] by the spread code C21 having the SP of 2.

Similarly, when an information bit stream S102 of 192K [coded bit/sec] is input, the spread-code multiplier 104 generates a transmission symbol stream S103 of 256K[chip/sec] by multiplying the information bit stream S102 of 192K[coded bit/sec] by a spread code C21 having an SP of 1 and inserting a null bit invalid as data into an insufficient code portion. When an information bit stream S102 of 256K[coded bit/sec] is input, the multiplier 104 generates a transmission symbol stream S103 of 256K[chip/sec] by multiplying the information bit stream S102 of 256K[coded bit/sec] by the spread code C21 having an SP of 1.

Moreover, the control section 102 stepwise increases transmission power by controlling the transmitting circuit 108. When reading the information bit stream S101 of 32K[bit/sec] from the buffer 101, the section 102 transmits the transmission signal S106 spread by the spread code C21 corresponding to a bit rate by a transmission power "a" through a communication channel of 100[KHz] of a bandwidth of 400[KHz]. Then, when reading the information bit stream S101 of 64K[bit/sec] from the buffer 101, the control section 102 transmits the transmission signal S106 by a transmission power "2a" through a communication channel of 200[KHz] (communication channel having a bandwidth of 100[KHz](2) of the bandwidth of 400[KHz].

Then, when reading the information bit stream S101 of 96K[bit/sec] from the buffer 101, the control section 102 transmits the transmission signal S106 by a transmission power "3a" through a communication channel of 300[KHz] (communication channel having a bandwidth of 100[KHz] (3) of the bandwidth of 400[KHz]. When reading the information bit stream S101 of 128[bit/sec] from the buffer 101, the control section 102 transmits the transmission signal S106 by a transmission power "4a" through a communication channel of the bandwidth of 400[KHz] (communication channel having a bandwidth of 100[KHz](4).

Thus, the control section 102, instead of encoding the information bit stream S100 at a bit rate of 128K[bit/sec] desired by a user and transmitting it, finally encodes the stream S100 at a bit rate of 128K[bit/sec] while classifying the stream S100 into four stages and stepwise increasing the bit rate and transmits the transmission signal S106 by a transmission power through the number of communication channels of a bandwidth corresponding to the bit rate for each stage.

Thereby, the transmitter 100 can transmit the transmission signal S106 through the number of channels corresponding to the increase of bit rates while stepwise increasing the bit rate only by the transmitter 100 having a bandwidth of 400[KHz] without using pluralities of transmitters for transmitting encoded bit streams S102 having bit rates different from each other every bandwidth by using a prepared communication channel having the bandwidth of 400[KHz], thereby classifying the encoded bit streams S102 into four channels by a spread code C21, respectively using a predetermined band portion of the bandwidth of 400[KHz], and thereby performing communication.

In this connection, before the bit rate of the information bit stream S101 read from the buffer 101 reaches 128K[bit/sec], control signals are transferred between a base station and a portable telephone as a warming-up period. However, in the case of a communication environment for transmitting the data for which a real-time property is not requested, it is possible to transmit an actual information bit stream from the beginning by using the warming-up period.

Figure 15:
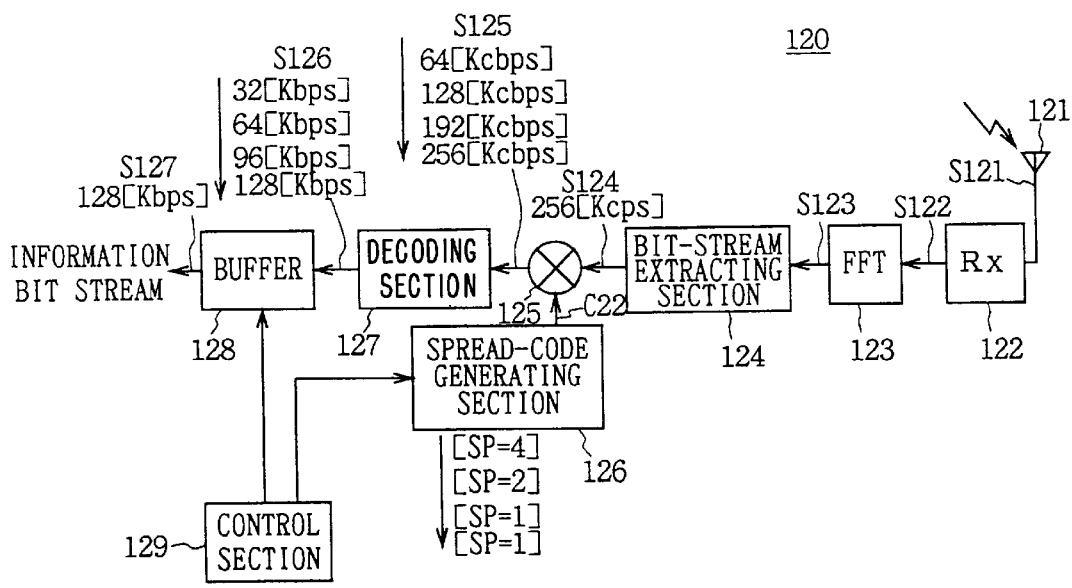
FIG. 15 is a block diagram showing the structure of a receiver in the multicarrier-communication cellular radio-communication system of the third embodiment of the present invention.

Moreover, as shown in FIG. 15, symbol 120 denotes a receiver of the present invention, which receives a transmission signal S106 transmitted from the transmitter 100 by an antenna 121 and transmits the signal S106 to a receiving circuit 122 as a reception signal S121. The receiving circuit 122 amplifies a reception signal S121 up to a predetermined level, then fetches a base-band signal by frequency-converting the signal S121, filters the base-band signal, then fetches a reception signal S122 by converting the base-band signal into a digital signal, and transmits the signal S122 to a fast-Fourier-transforming (FFT) section 123.

In this case, the receiving circuit 122 receives the transmission signal S106 with channels same as the number of channels at the transmission side and thereby, it can accurately execute the receiving operation by following the change of the number of channels at the transmission side.

The fast-Fourier-transforming section 123 fetches a signal component by applying windowing to the input reception signal S122, fetches a reception signal S123 obtained by arranging a symbol group arranged on a frequency axis and fetched on a time base by Fourier-transforming the fetched signal component, and transmits the signal S123 to a bit-stream extracting section 124. In this connection, the fast-Fourier-transforming section 123 applies windowing to the reception signal S123 by applying a cosine roll-off filter to the signal S123 on a time base similarly to the case of the inverse-fast-Fourier-transforming section 107.

The bit-stream extracting section 124 fetches symbol information by BPSK-demodulating the reception signal S123 and transmits the symbol information to a spread-code multiplier 125 as a reception symbol stream S124.

The spread-code multiplier 125 generates a spread code C22 having the same spreading ratio as that of the spread code C21 generated by the spread-code generating section 105 at the transmission side by a spread-code generating section 126, applies reverse-spreading by multiplying the reception symbol stream S124 by the spread code C22, and transmits a reception symbol stream S125 thereby obtained to a decoding section 127.

In this case, the spread-code generating section 126 supplies the spread code C22 by changing the spreading ratio of the code C22 in accordance with a control signal supplied from a control section 129. Thereby, the receiver 120 generates reception symbol streams S125 having the same bit rate as that when performing encoding at the transmission side by multiplying the reception symbol stream S124 by the spread codes C22 having spreading ratios different from each other.

The decoding section 127 generates an information bit stream S126 having a bit rate when read from the buffer 101 at the transmission side by deinterleaving the input reception symbol stream S125, maximum-likelihood-series-estimating a reception symbol stream thus obtained and thereby, applying soft-decision Viterbi decoding and stores the stream S126 in a buffer 128. The buffer 128 restores transmitted data by reading an information bit stream S127 at a bit rate of 128K[bit/sec] in accordance with a control signal supplied from the control section 129.

According to the above structure, after the transmitter 100 encodes the information bit stream S100 to be transmitted at a bit rate of 128K[bit/sec] desired by a user and transmits it, the transmitter 100 transmits the encoded transmission symbol stream S102 of 256K[coded bit/sec] by a large transmission power "4a" corresponding to bit rates through a communication channel having a bandwidth of 400[KHz] (communication channel having a bandwidth of 100[KHz] (4). In this case, the transmitter 100 greatly influences other types of communication because interference waves are suddenly generated when calls for one channel occur.

Therefore, the transmitter 100 can transmit the information bit stream S100 by an optimum transmission power corresponding to the number of channels used by transmitting the stream S100 through the number of channels corresponding to stepwise increase of bit rates instead of encoding the stream S100 at a bit rate of 128K[bit/sec] desired by a user from the beginning and transmitting it. Thus, it is possible to stepwise increase transmission power.

Thereby, the transmitter 100 performs transmission while stepwise increasing transmission power without suddenly performing transmission by a large transmission power when a call occurs. Thereby, it is possible to prevent interference components to be provided for other types of communication from being suddenly increased. As a result, because the transmitter 100 has a temporal delay before increasing transmission power in accordance with a power-control command. Therefore, it is possible to prevent a time lag from occurring before increasing the transmission power and thereby, it is possible to prevent a call between a base station and a portable telephone from being instantaneously broken.

Moreover, in the case of the transmitter 100, a bit rate is stepwise and linearly increased every 32K[bit/sec]. Therefore, it is only necessary to stepwise increase interference components little by little and it is possible to minimize the influence of interference waves on other types of communication.

According to the above structure, the transmitter 100 can prevent transmission power from being suddenly increased due to occurrence of a call by starting transmission through the number of channels corresponding to an information bit stream having a low bit rate at the beginning of establishment of the call and stepwise increasing the number of channels to be used correspondingly to the increase of bit rates. Thus, it is possible to prevent interference components produced due to occurrence of a call from being suddenly increased and perform communication without affecting other types of communication even under a communication environment in which the number of repetitions of frequency is "1."

(4) Other Embodiment

For the above embodiments, a case is described in which the present invention is applied to a cellular radio-communication system when the number of repetitions of frequency is "1." However, the present invention is not restricted to the above case. It is also possible to apply the present invention to a cellular radio-communication system under a communication environment subject to the influence of interference waves because cells using the same frequency band is present nearby such as a case in which the number of repetitions of frequency is "3."

Moreover, for the above first embodiment, a case is described in which the transmission symbol stream S42 of 204.8K[coded bit/sec] obtained by encoding the information bit stream S41 of 96K[bit/sec] read at the third stage from the buffer 41 by the encoding section 43 is spread in accordance with the spread code C11 having the spreading ratio (SP) of 10. However, the present invention is not restricted to the above case. It is also possible to perform spreading by using a spread code having a spreading ratio (SP) of 8 when only orthogonal codes orthogonal to each other are used as spread codes. In this case, a transmission symbol stream S43 of 2048K[chip/sec] is generated by inserting an invalid null bit into an insufficient code portion.

Figure 16:
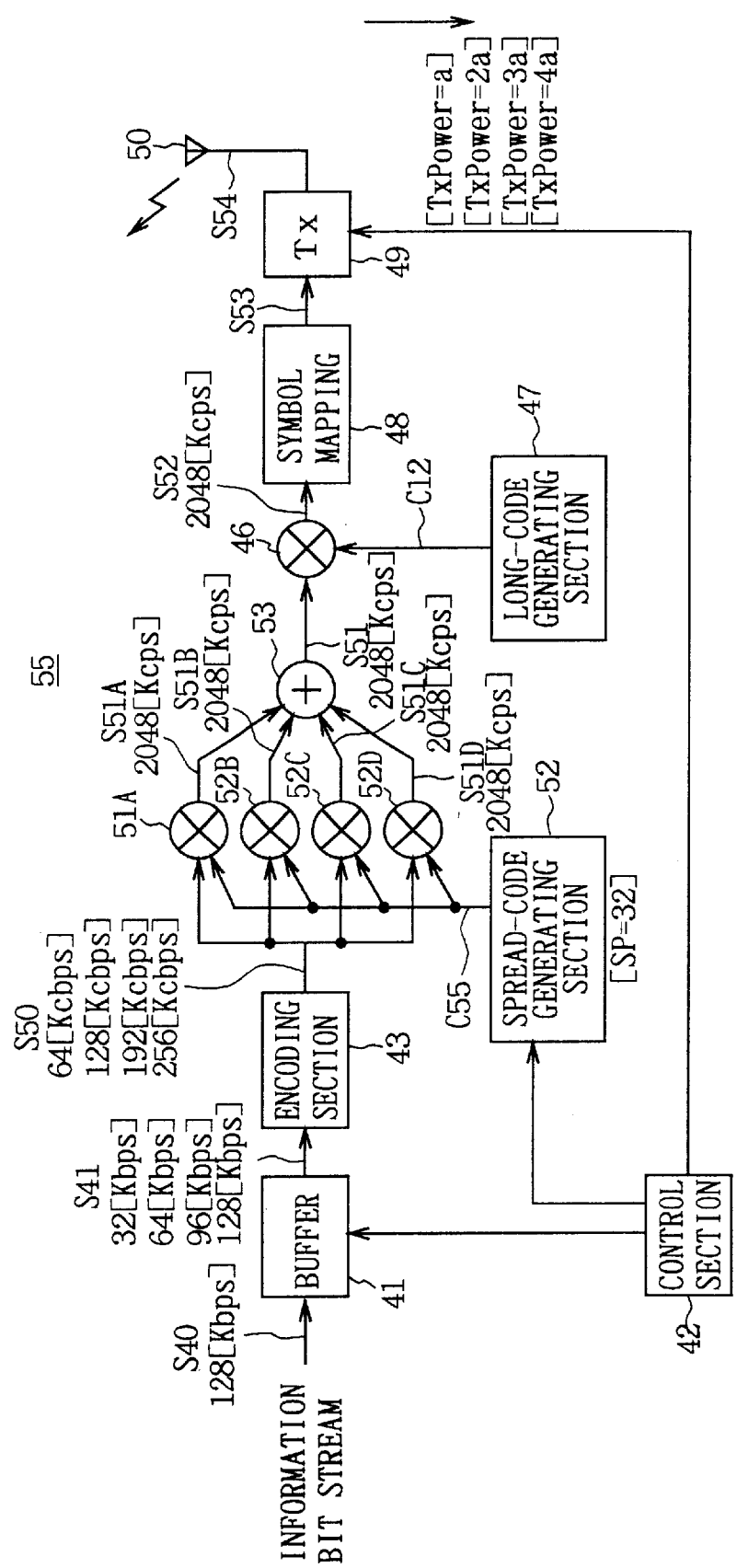
FIG. 16 is a block diagram showing the structure of a transmitter in the cellular radio-communication system of another embodiment.

Furthermore, for the above first embodiment, a case is described in which the spread codes C11 and C14 having four spreading ratios different from each other are used. However, the present invention is not restricted to the above case. It is also possible to generate a transmission signal by using only the spread code having a spreading ratio (SP) of 32. In this case, in FIG. 16 in which a portion corresponding to that in FIG. 6 is provided with the same symbol, a transmitter 55 generates only a spread code C55 having a spreading ratio (SP) of 32 by the spread-code generating section 52. When a transmission symbol stream S50 encoded by an encoding section 43 has a bit rate of 64K [bit/sec], the transmission symbol stream S50 is multiplied by the spread code C55 by a spread-code multiplier 51A, output as a transmission symbol stream S51 of 2048K[chip/sec], and finally transmitted from a transmitting circuit 49 by a transmission power "a."

Moreover, when the transmission symbol stream S50 encoded by the encoding section 43 has a bit rate of 128K[bit/sec], the transmitter 55 outputs the transmission symbol stream S42 as a transmission symbol stream S51 of 2048K[chip/sec] by dividing the stream S42 every 64K[bit/sec] and transmitting the divided streams S42 to spread-code multipliers 51A and 51B one each, multiplying the streams S42 by the spread code C55 by the spreadcode multipliers 51A and 51B, and multiplexing them by an adder 53, and finally transmits the stream S51 from a transmitting circuit 49 by a transmission power "2a."

Furthermore, when the transmission symbol stream S50 encoded by the encoding section 43 has a bit rate of 192K[bit/sec], the transmitter 55 outputs the transmission symbol stream S42 as a transmission symbol stream S51 of 2048[chip/sec] by dividing the stream S42 into three streams S42 every 64K[bit/sec], transmitting the divided streams S42 to spread-code multipliers 51A, 51B, and 51C one each, multiplying the streams S42 by the spread code C55 by the spread-code multipliers 51 A, 51B, and 51C, and multiplexing them by the adder 53 and finally, transmits the stream S51 from the transmitting circuit 49 by a transmission power "3a."

Finally, when-the transmission symbol stream S50 encoded by the encoding section 43 has a bit rate of 256K[bit/sec], the transmitter 55 outputs the stream S42 as a transmission symbol stream S51 of 2048K[chip/sec] by dividing the stream S42 into four streams S42 every 64K [bit/sec] and transmitting the divided streams S42 to spread-code multipliers 51A, 51B, 51C, and 51D one each, multiplying the divided streams S42 by the spread code C55 by the spread-code multipliers 51A, 51B, 51C, and 51D, and multiplexing them by the adder 53, and finally transmits the stream S51 from the transmitting circuit 49 by a transmission power "4a."

Thus, the transmitter 55 can stepwise increase transmission power by using only the spread code C55 having one type of a spreading ratio (SP) of 32, performing multiplication in parallel correspondingly to the increase of bit rates and thereafter performing multiplexing, then performing transmission by a transmission power corresponding to each bit rate and thus, it is possible to minimize the influence of interference waves on other types of communication.

Furthermore, for the above second embodiment, a case is described in which the present invention is applied to a multicarrier-communication cellular radio-communication system that performs frequency hopping. However, the present invention is not restricted to the above case. It is also possible to apply the present invention to a multicarrier-communication cellular radio-communication system that performs time-slot hopping. It is still also possible to apply the present invention to a single-carrier-communication cellular radio-communication system that performs frequency hopping or time-slot hopping independently of the multi-carrier communication system.

Figure 17:
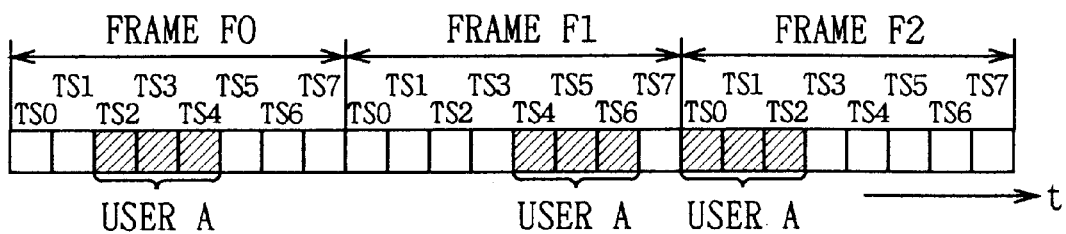
FIG. 17 is a schematic diagram for explaining time-slot hopping for another embodiment.

In this case, as shown in FIG. 17, by making time-slot regions assigned to a user A successively hop every frame at random, it is possible to reduce the influence of interference waves received from other types of communication. Moreover, in this case, by using pluralities of time slots, it is possible to perform high-speed transmission. Therefore, by stepwise increasing transmission power in accordance with a bit rate corresponding to the increase of the number of time slots (number of channels), it is possible to minimize the influence of interference waves on other types of communication.

Furthermore, for the above second embodiment, a case is described in which the present invention is applied to a multicarrier-communication cellular radio-communication system that performs frequency hopping. However, the present invention is not restricted to the above case. It is also possible to apply the present invention to a multicarrier- or single-carrier-communication cellular radio-communication system that performs frequency hopping and time-slot hopping.

Furthermore, for the above second embodiment, a case is described in which the crosstalk with other types of communication performed by using the same channel is avoided by adding random phase values to phases of pluralities of subcarriers in the inverse-fast-Fourier-transforming section 85 and thereby, performing the random phase shift processing for randomizing the phase values of the subcarriers. However, the present invention is not restricted to the above case. It is also possible to apply the present invention to avoid the crosstalk with other types of communication performed by using the same channel by multiplying the transmission symbol stream S83 by a random orthogonal matrix and moreover multiplying the stream S83 by an inverse matrix to the orthogonal matrix used at the transmission side also at the reception side.

Furthermore, for the above second embodiment, a case is described in which a bandwidth used is stepwise increased every 100[KHz]. However, the present invention is not restricted to the above case. It is also possible to increase a bandwidth so as to be shown by exponents of "2" (100[KHz] so that the bandwidth becomes 100[KHz], 200[KHz], 400 [KHz], and 800[KHz]. In this case, it is necessary to make the encoding rate spreading ratio of an encoding section 83 variable and linearly increase the transmission symbol stream S82. Also in this case, however, it is assumed that transmission power increases proportionally to the bit rate of the information bit stream S81.

Furthermore, for the above second embodiment, a case is described in which transmission is performed by assigning a bandwidth of 100[KHz] at the time of first channel assignment and then, the bandwidth is widened to 200 [KHz], 300[KHz], and 400[KHz] so as to increase the number of channels. However, the present invention is not restricted to the above case. It is also possible to assign a bandwidth of 400[KHz] at the time of first channel assignment, perform transmission by using a bandwidth of 100[KHz] in a bandwidth of 400[KHz] (without using the remaining 300[KHz] when the information bit stream S81 of 32K[bit/sec] is read from the buffer 81, and perform transmission by stepwise increasing a bandwidth to be used to 200[KHz], 300[KHz], and 400[KHz] in accordance with the increase of bit rates while stepwise increasing the number of channels. In this case, an algorithm assigned to a channel is simplified.

Furthermore, for the above second embodiment, a case is described in which transmission is performed by assigning a bandwidth of 100[KHz] which is approx. $\frac{1}{32}$ the frequency bandwidth 3.2[MHz] of the entire system at the time of first channel assignment and then a bandwidth is assigned by widening the bandwidth to 200[KHz], 300[KHz], and 400 [KHz] every step of 100[KHz] in accordance with the next bit rate. However, the present invention is not restricted to the above case. It is also possible to perform transmission by assigning a bandwidth of 50[KHz] which is approx. $\frac{1}{64}$ the frequency bandwidth 3.2[MHz] of the entire system and assigning a bandwidth by widening the bandwidth to 100 [KHz], 150[KHz], and 200[KHz] every step of 50[KHz] in accordance with the next bit rate. In short, by starting transmission at a bandwidth of approx. $\frac{1}{32}$ or less the frequency bandwidth of the entire system and widening a bandwidth at a step same as that of the first-set bandwidth and thereby assigning it, it is possible to minimize the influence of interference components when starting transmission and moreover minimize the subsequent increase rate of interference components.

Figure 18:
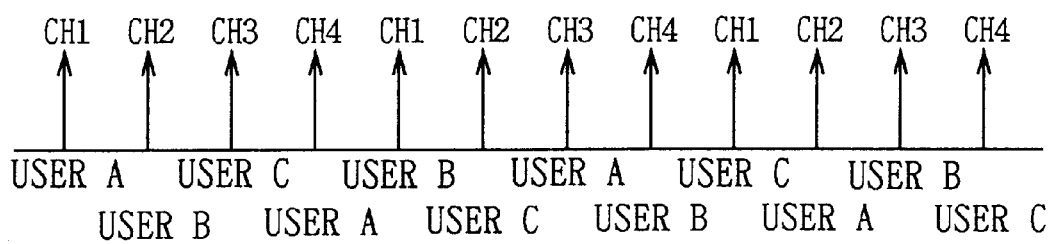
FIG. 18 is a schematic diagram for explaining the structure of pluralities of channels through frequency division for another embodiment.

Furthermore, for the above third embodiment, a case is described in which, by using the spread code C21 having a spreading ratio (SP) of 4, four channels share a bandwidth of 400[KHz] at the same time and each channel uses a predetermined band portion of a bandwidth of 400[KHz] as a communication channel to perform communication. However, the present invention is not restricted to the above case. It is also possible to set pluralities of channels by assigning a different user every subcarrier having a predetermined bandwidth as shown in FIG. 18. In this case, for a user to perform high-speed transmission, it is possible to increase the number of subcarriers to be assigned.

Furthermore, for the above third embodiment, a case is described in which transmission is performed in accordance with the multicarrier communication system by using the spread code C21 and thereby setting pluralities of channels at the same frequency band. However, the present invention is not restricted to the above case. It is also possible to apply the present invention to a communication system for performing communication every predetermined time slot by spreading normal single carriers with spread codes.

As described above, the present invention makes it possible to prevent transmission power from being suddenly increased from the beginning of start of transmission by performing transmission through the number of channels corresponding to a low transmission rate at the beginning of start of transmission of a transmission signal while stepwise increasing the number of channels as the transmission rate is slowly stepwise increased and thus, it is possible to perform communication without affecting other types of communication.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmission method for generating a transmission symbol series by applying predetermined modulation processing to an encoded bit series obtained by encoding an information bit series of a predetermined transmission rate and transmitting a transmission signal generated by applying predetermined transmission processing to said transmission symbol series through a predetermined communication channel, the method comprising the steps of:

generating a transmission-information bit series of a transmission rate lower than said predetermined transmission rate in accordance with said information bit series and starting the transmission of said transmission signal generated in accordance with said transmission-information bit series through said communication channel; and sequentially stepwise increasing said low transmission rate of said transmission-information bit series to reach said predetermined transmission rate and transmitting said transmission signal while sequentially stepwise increasing a number of said communication channels to be used in accordance with the sequential stepwise increase of said low transmission rate; and sequentially stepwise increasing transmission power in accordance with the sequential stepwise increase of said low transmission rate.

2. The transmission method according to claim 1, further comprising the step of performing the step of transmitting said transmission signal using a minimum number of channels less than or equal to $\frac{1}{32}$ of a total number of said communication channels at a time said transmitting is started.

3. The transmission method according to claim 1, further comprising the step of performing the step of transmitting the transmission signal using a minimum number of channels less than or equal to $\frac{1}{32}$ of a total number of said communication channels at a time said transmitting is started to increase the number of channels to be used in accordance with the sequential stepwise increase of said low transmission rate.

4. The transmission method according to claim 1, further comprising the steps of:

previously assigning the number of said communication channels to be used when reaching said predetermined transmission rate; and starting the transmitting of said transmission signal at said low transmission rate by using some of said channels to increase the number of channels to be used in accordance with the sequential stepwise increase of said low transmission rate.

5. A transmitter for generating a transmission symbol series by applying predetermined modulation processing to an encoded bit series obtained by encoding an information bit series of a predetermined transmission rate and transmitting a transmission signal generated by applying predetermined transmission processing to said transmission symbol-series through a predetermined communication channel, said transmitter comprising:

transmission-signal generating means for generating a transmission-information bit series of a transmission rate lower than said predetermined transmission rate in accordance with said information bit series; and transmitting means for transmitting said transmission signal by generating said transmission signal in accordance with said transmission-information bit series, for starting the transmitting of said transmission signal through said communication channel, and for sequentially stepwise increasing the low transmission rate of said transmission-information bit series to make the low transmission rate reach said predetermined transmission rate while sequentially stepwise increasing a number of said communication channels used in accordance with the sequential stepwise increase of said low transmission rate and for sequentially stepwise increasing transmission power in accordance with the sequential stepwise increase of said low transmission rate.

6. The transmitter according to claim 5, wherein said transmitting means performs transmission with a minimum number of channels less than or equal to $\frac{1}{32}$ of a total number of said communication channels at a time said transmitting is started.

7. The transmitter according to claim 5, wherein said transmitting means performs said transmitting with a minimum number of channels less than or equal to $\frac{1}{32}$ of a total number of said communication channels at a time said transmitting is started and increases the number of channels used in accordance with the sequential stepwise increase of said low transmission.

8. The transmitter according to claim 5, wherein said transmitting means starts the transmission of said transmission signal at said low transmission rate by previously assigning the number of said communication channels used when reaching said predetermined transmission rate and using some of said channels and increases the number of channels to be used in transmission in accordance with the sequential stepwise increase of said low transmission rate.

* * * * *